United States Patent [19]
Gray

[11] Patent Number: 5,777,824
[45] Date of Patent: Jul. 7, 1998

[54] SIDE-DISPOSED THIN FILM MAGNETIC HEAD AND METHOD OF FABRICATION THEREOF

[75] Inventor: G. Robert Gray, Fremont, Calif.

[73] Assignee: AIWA Research and Development, Inc., Fremont, Calif.

[21] Appl. No.: 645,182

[22] Filed: May 13, 1996

Related U.S. Application Data

[63] Continuation of Ser. No. 297,191, Aug. 26, 1994, abandoned.

[51] Int. Cl.[6] .................. G11B 5/127; G11B 5/60; G11B 15/64; G11B 17/32
[52] U.S. Cl. .................. 360/103; 29/603.01; 360/126
[58] Field of Search .................. 360/103, 126, 360/120, 113; 29/603

[56] References Cited

U.S. PATENT DOCUMENTS

| | | | |
|---|---|---|---|
| 3,723,665 | 3/1973 | Lazzari et al. | 179/100.2 C |
| 3,810,245 | 5/1974 | Ozawa et al. | 360/127 |
| 4,157,616 | 6/1979 | Bischoff | 360/126 |
| 4,340,568 | 7/1982 | Hirai et al. | 422/245 |
| 4,414,554 | 11/1983 | Springer | 346/74.5 |
| 4,470,051 | 9/1984 | Springer | 346/74.5 |
| 4,494,125 | 1/1985 | Springer | 346/74.5 |
| 4,503,439 | 3/1985 | Springer | 346/74.5 |
| 4,503,440 | 3/1985 | Springer | 346/74.5 |
| 4,539,280 | 9/1985 | Springer | 430/39 |
| 4,544,421 | 10/1985 | Springer | 148/103 |
| 4,639,289 | 1/1987 | Lazzari | 156/643 |
| 4,809,103 | 2/1989 | Lazzari | 360/103 |
| 4,837,924 | 6/1989 | Lazzari | 29/603 |
| 4,901,177 | 2/1990 | Lazzari | 360/113 |
| 4,912,584 | 3/1990 | Mallary et al. | 360/120 |
| 4,942,490 | 7/1990 | Lehureau | 360/126 |
| 4,949,207 | 8/1990 | Lazzari | 360/119 |
| 4,953,050 | 8/1990 | Kumura et al. | 360/126 |
| 4,970,615 | 11/1990 | Gau | 360/122 |
| 4,984,118 | 1/1991 | Springer | 360/125 |
| 4,992,897 | 2/1991 | Deroux-Dauphin | 360/103 |
| 5,020,212 | 6/1991 | Michijima et al. | 29/603 |

(List continued on next page.)

FOREIGN PATENT DOCUMENTS

| | | |
|---|---|---|
| 0 467 263 A2 | 7/1991 | European Pat. Off. |
| 0 584 707 A2 | 8/1993 | European Pat. Off. |
| 0 584 707 A3 | 8/1993 | European Pat. Off. |
| 55067929 | 5/1980 | Japan. |
| 59-101025 | 11/1984 | Japan. |
| 1303614 | 10/1988 | Japan. |
| 63259079 | 7/1989 | Japan. |
| 3012886 | 1/1991 | Japan. |
| 3-222108 | 12/1991 | Japan. |
| 4202075 | 7/1992 | Japan. |

OTHER PUBLICATIONS

CRC Handbook of Chemistry and Physics, 47th edition, 1966. Editors: Weast and Selby. Publisher: The Chemical Rubber Co.

U.S Patent application Serial No. 07/531,832 filed Jun. 1, 1990, entitled Unitary Read–Write Head Array for Magnetic Media. Inventor Gilbert D. Springer.

(List continued on next page.)

Primary Examiner—Tom Thomas
Assistant Examiner—Adriana Giordana
Attorney, Agent, or Firm—Skjerven, Morrill, MacPherson, Franklin & Friel LLP; Ken J. Koestner

[57] ABSTRACT

A thin film "third axis" magnetic head is provided which is resistant to head wear which heads typically experience when operating in close proximity to a magnetic recording media. A relatively soft magnetic core is formed on the third axis surface of a hard insulative substrate. The magnetic core includes a gap region at the edge of the third axis surface. The gap region and a portion of the magnetic core adjacent the gap region are covered with a protective layer of hard material, such as diamond-like carbon (DLC). In this manner, a ruggedized sandwich-like head structure is formed including the hard substrate, the enclosed relatively soft magnetic core and the protective layer of hard DLC material.

32 Claims, 15 Drawing Sheets

U.S. PATENT DOCUMENTS

| | | | |
|---|---|---|---|
| 5,041,932 | 8/1991 | Hamilton | 360/104 |
| 5,065,271 | 11/1991 | Matsuura et al. | 360/126 |
| 5,073,242 | 12/1991 | Hamilton | 204/192.22 |
| 5,090,111 | 2/1992 | Lazzari | 29/603 |
| 5,111,351 | 5/1992 | Hamilton | 360/104 |
| 5,163,218 | 11/1992 | Hamilton | 29/603 |
| 5,166,845 | 11/1992 | Thompson et al. | 360/103 |
| 5,168,408 | 12/1992 | Lazzari | 360/113 |
| 5,189,580 | 2/1993 | Pisharody et al. | 360/126 |
| 5,195,006 | 3/1993 | Morikawa | 360/126 |
| 5,196,976 | 3/1993 | Lazzari | 360/113 |
| 5,198,948 | 3/1993 | Stover et al | 360/124 |
| 5,202,863 | 4/1993 | Miyatake et al | 369/13 |
| 5,208,716 | 5/1993 | Lazzari | 360/113 |
| 5,216,559 | 6/1993 | Springer | 360/106 |
| 5,224,260 | 7/1993 | Fedeli et al. | 29/603 |
| 5,255,260 | 10/1993 | Yamada et al. | 360/103 |
| 5,260,845 | 11/1993 | Takayama et al. | 360/103 |
| 5,266,409 | 11/1993 | Schmidt et al. | 428/446 |
| 5,274,521 | 12/1993 | Miyauchi et al. | 360/119 |
| 5,296,992 | 3/1994 | Abe | 360/126 |
| 5,331,493 | 7/1994 | Schwarz | 360/113 |
| 5,359,481 | 10/1994 | Egawa | 360/103 |
| 5,408,373 | 4/1995 | Bajorek et al. | 360/126 |
| 5,420,612 | 5/1995 | Brock et al. | 347/201 |
| 5,425,983 | 6/1995 | Propst et al. | 428/216 |

OTHER PUBLICATIONS

A. Sano, M. Egawa, M. Nitta, K. Takayanagi, T. Matsushita, and T. Fujita, A Low Inductance Metal–In–Gap Head using a Side–Core Concept, ©1993, IEEE Transactions on Magnetics, vol. 29, No. 6, pp. 3888–3890.

K.L.Mittal, Factors Affecting Adhesion of Lithographic Materials, Solid State Technology, May 1979, pp. 89–100.

J.P. Lazzari and P. Deroux–Dauphin, A New Thin Film Head Generation IC Head, IEEE Transactions on Magnetics, vol.25, No. 5, Sep. 1989, pp 3173–3193.

SIDE-DISPOSED THIN FILM MAGNETIC HEAD AND METHOD OF FABRICATION THEREOF

This application is a continuation of application Ser. No. 08/297,191, filed Aug. 26, 1994, now abandoned.

BACKGROUND OF THE INVENTION

1. Field of the Invention

This invention relates in general to magnetic recording and playback heads and, more particularly, to thin film magnetic recording and playback heads.

2. Description of Related Art

As seen in one conventional magnetic head arrangement shown in FIG. 1A, many of today's magnetic recording and playback devices include a slider 10 which is attached to the end of a movable arm 15. In this example, a magnetic head 20 is integral to the slider. The slider/head assembly 25 thus formed is mechanically stepped to a selected track on a moving magnetic media 30 for recording/playback purposes. The slider is aerodynamically shaped to "fly" on a cushion of air in close proximity to magnetic media 30 which moves in a direction indicated by arrow 35.

FIG. 1B shows a close-up perspective view of a conventional slider 10 on which a magnetic head 20 is situated. Magnetic head 20 includes a gap 20A. Slider 10 includes upper planar surface 10A (a first axis surface), a front side surface 10B (a second axis surface), and lateral side surface 10C (a third axis surface), each surface corresponding to a different respective axis of the slider. In FIG. 1B, magnetic head 20 is located on front side surface 10B and is thus said to be a "second axis" head. A "first axis" head is a head which is located on upper planar surface 10A.

The particular second axis head 20 illustrated in FIG. 1B is recessed into front side surface 10B. A channel 22 is cut from front to back of slider 10 as shown. In this manner, two parallel spaced apart rails 24A and 24B are formed which make up part of the flying surface of slider 10.

In the continuing quest for increased storage density in magnetic media storage devices, thin film magnetic heads have been developed. As opposed to earlier types of magnetic heads, the fabrication of which involves significant piecework and manual handling of individual parts, thin film magnetic heads take advantage of semiconductor fabrication processes to form a large number of heads simultaneously on a common substrate or wafer. Such a thin film magnetic head can be used as head 20 of FIGS. 1A and 1B.

Unfortunately, when a "second axis" thin film head is fabricated, the size of the coil and electrical contact structures of the head typically limit the location of the channel in the very small sliders which are now being fabricated. It is noted that the channel and rails control the slider's flying performance over the magnetic recording media. Thus, limitations on the placement of the channel on the slider are not desirable.

Moreover, in "second axis" heads the size of the coil structure and other head structures also results in an inherent limitation on how close the head gap can be located to the lateral side surface 10C (third axis surface) of slider 10. This in turn limits how close the head gap can be positioned with respect to the edge of the recording media.

To overcome some of the problems of the second axis head, a third axis head has been developed. Illustrative third axis heads are described in an article by A. Sano et al. entitled "A Low Inductance Metal-In-Gap Head Using A Side-Core Concept", IEEE Transactions On Magnetics, Vol. 29, No. 6, November 1993, and in an article by Takayama et al., entitled "Development of MIG/Thin Film Coil Hybrid Magnetic Recording Head". Typically, the entire core, or a portion of the core, is formed as part of the slider. The coils are incorporated either by hand wiring the core, or by attaching a thin film coil assembly. While the thin film coil assembly is economically an improvement over hand-wired coils, further economy and reliability are desired.

SUMMARY OF THE INVENTION

Advantageously, recession of the head gap is avoided in one aspect of the present invention, thereby improving the strength of the recorded and detected signals.

One advantage of another aspect of the present invention is the providing of a thin film head, including core and coils, on the side of a support structure.

Another advantage of the thin film head of the present invention is that one embodiment of the head can be fabricated without using via holes for electrical connection purposes.

Yet another advantage of the thin film head of the present invention is that the disclosed head can be fabricated in large quantities using thin film semiconductor fabrication equipment.

In accordance with one embodiment of the present invention, a slider/head assembly is provided including a slider substrate having a first axis surface, a second axis surface and a third axis surface. The slider substrate includes a common edge at which the first surface abuts the third surface. The slider/head assembly also includes a magnetic core situated on the slider, the magnetic core having a gap region which opens onto the common edge of the slider. The slider/head assembly further includes a hard protective layer situated atop the magnetic core and covering the magnetic core adjacent the common edge of the slider. In this manner, a protective sandwich-like structure is formed by the substrate and hard protective layer to protect the relatively soft magnetic core therebetween from undesired head wear.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

We have found that the gaps of third axis heads, and to a lesser degree second axis heads, are often recessed beneath the surface of the slider on which they are disposed. The recessed property occurs as a result of the lapping process applied to the slider in forming the aerodynamic shape of the slider. The relatively soft materials of the core are stretched and disproportionally removed during the lapping process, so that when the core material remaining after lapping relaxes, it retreats beneath the plane of the slider surface. The problem typically does not lead to significant weakness in the recorded signal strength in many second axis head applications, since each recorded region of the magnetic media receives flux from over the full length of the gap. However, in third axis head applications, the recorded signal strength can be undesirably weak since each recorded region of the magnetic media receives flux from just over the relatively narrow width of the gap.

A fabrication process for a thin film third axis head, which typically is of value in magnetic disks, is shown in FIGS. 2A through 11E. However, the process is generally suitable for use in fabricating thin film magnetic heads that are disposed on a side of any type of supporting structure, wherein the supporting structure serves as a substrate for the fabrication. Such side-disposed heads are useful in a variety of applications, including, for example, digital tape backup units and video cassette tape recorders.

Figure 2A:
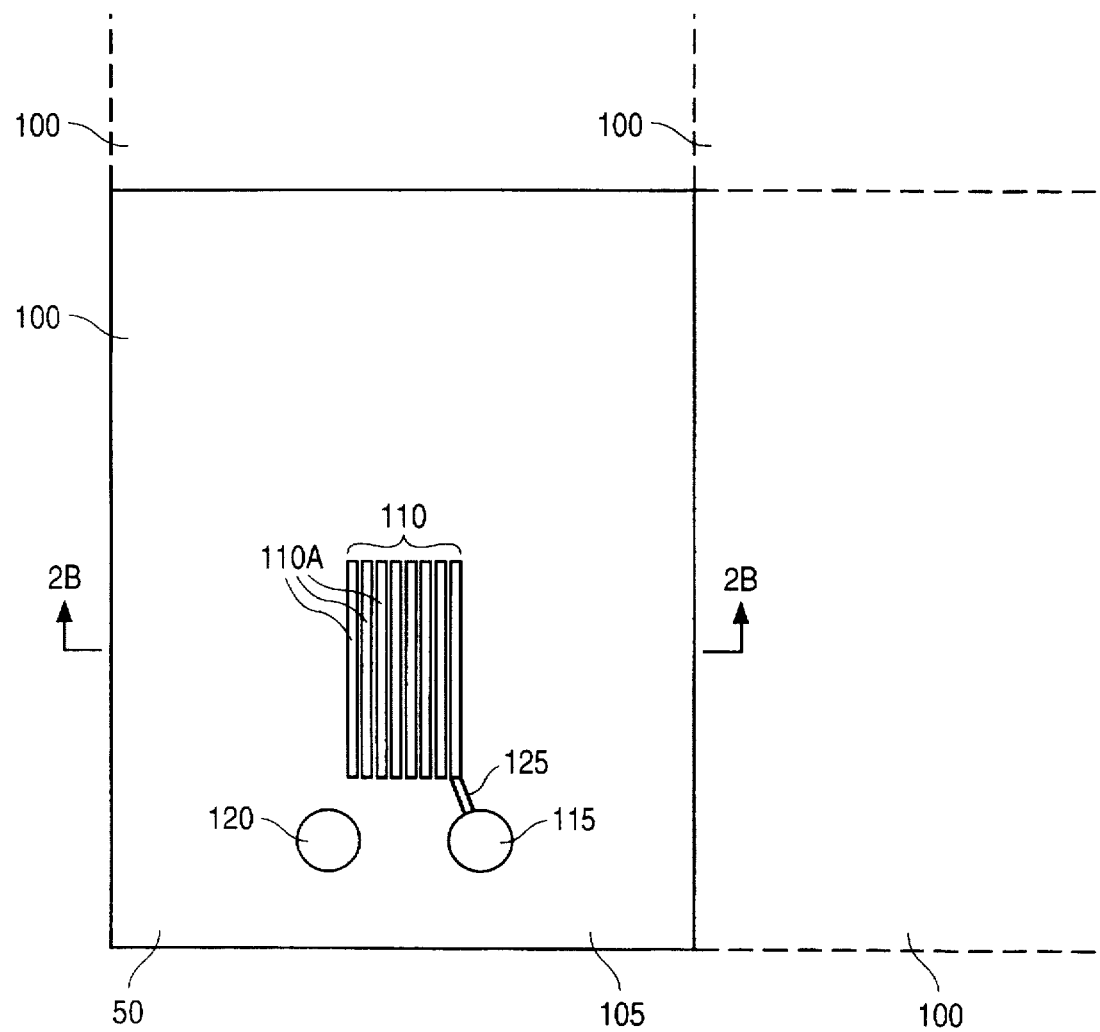
FIG. 2A is a plan view of a substrate on which a plurality of thin film heads are being fabricated in accordance with the invention, the lower coil member of a particular head being illustrated.

FIG. 2A shows a substrate 50 on which a plurality of thin film heads 100 are to be fabricated. In one embodiment, substrate 50 is fabricated from alumina and exhibits a thickness within the range of approximately 25µ to approximately 65µ. Thin film techniques are used to duplicate the structure of head 100 multiple times on substrate 50. Dashed lines are used in FIG. 2A to indicate that the pattern of head 100 is replicated multiple times on substrate 50. After the process of fabricating multiple heads 100 on a common substrate is complete, the resultant structure is cut or diced up to form individual heads. The heads are then machined to form sliders.

As illustrated in FIG. 2A, a seed layer 105 of electrically conductive material such as CrCu is sputtered on substrate 50. Layer 105 is used as a seed layer for subsequent plating steps in the fabrication of head 100. In this particular embodiment, seed layer 105 is relatively thin and exhibits a thickness within the range of approximately 200 Å to approximately 400 Å of sputtered Cr followed by approximately 500 Å to approximately 1000 Å of sputtered Cu. The Cr portion of seed layer 105 acts as an adhesion layer to enhance the adhesion of the remaining Cu portion of the seed layer.

Figure 2B:
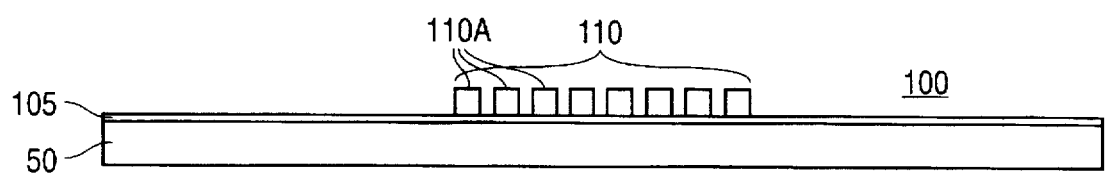
FIG. 2B is a cross section of the particular head of FIG. 2A taken along section line 2B—2B.

A lower coil member 110 is formed on seed layer 105 as shown in FIG. 2B. FIG. 2B is a cross section of the partially formed head 100 of FIG. 2A taken along section line 2B—2B. One way to form lower coil member 110 is to deposit a layer of photoresist (not shown) on seed layer 105. This photoresist layer is then patterned using conventional photolithographic techniques which includes photoresist application, masking, exposure, developing, and so forth. More specifically the photoresist layer is patterned to cover the entire surface of seed layer 105 except for openings at the locations where the coil elements 110A of lower coil member 110 are to be formed. Head 100 is then subjected to a plating bath of copper. Copper is thus plated in the openings of the photoresist layer to form lower coil layer 110. The thickness of coil member 110 is within the range of approximately 3µ to approximately 3.5µ at this stage.

Figure 2C:
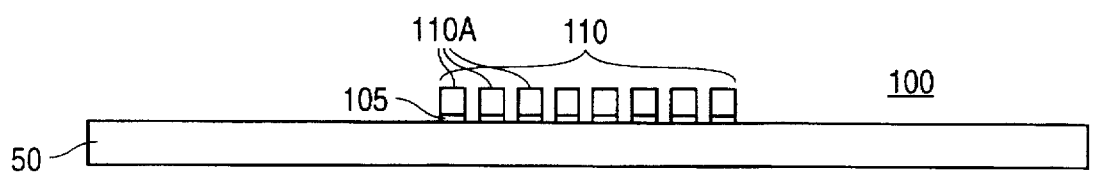
FIG. 2C is a view of the head of FIG. 2B after removal of a seed layer.

The partially formed head 100 of FIG. 2A is then subjected to a series of etchants which removes the exposed portions of seed layer 105 as shown in FIG. 2C. More particularly, to etch the CrCu seed layer 105, a solution of ammonium persulfate, ammonium hydroxide and water is used to etch the copper (Cu) portion of the seed layer and a solution of potassium permanganate, potassium hydroxide and water is used to etch the chrome (Cr) portion of the seed layer. In the course of removing seed layer 105, approximately 0.05μ of lower coil member 110 is also removed. However, this is such a small portion of the overall thickness of lower coil member 110 so that the coil's performance is not affected. For simplicity in the subsequent drawings, the portion of seed layer 110 which is left remaining under coil elements 110A of lower coil member 110 is not shown. It is noted that at the same time that lower coil member 110 is formed, circular coil connecting pads 115 and 120 and coil connective element 125 are formed by the same photolithographic/plating technique. Coil connecting pads 115 and 120 need not necessarily be circular. For example, pads 115 and 120 can also exhibit a square, rectangular or any other geometry, as well as any variety of sizes and locations, convenient for connecting wires.

Figure 3A:
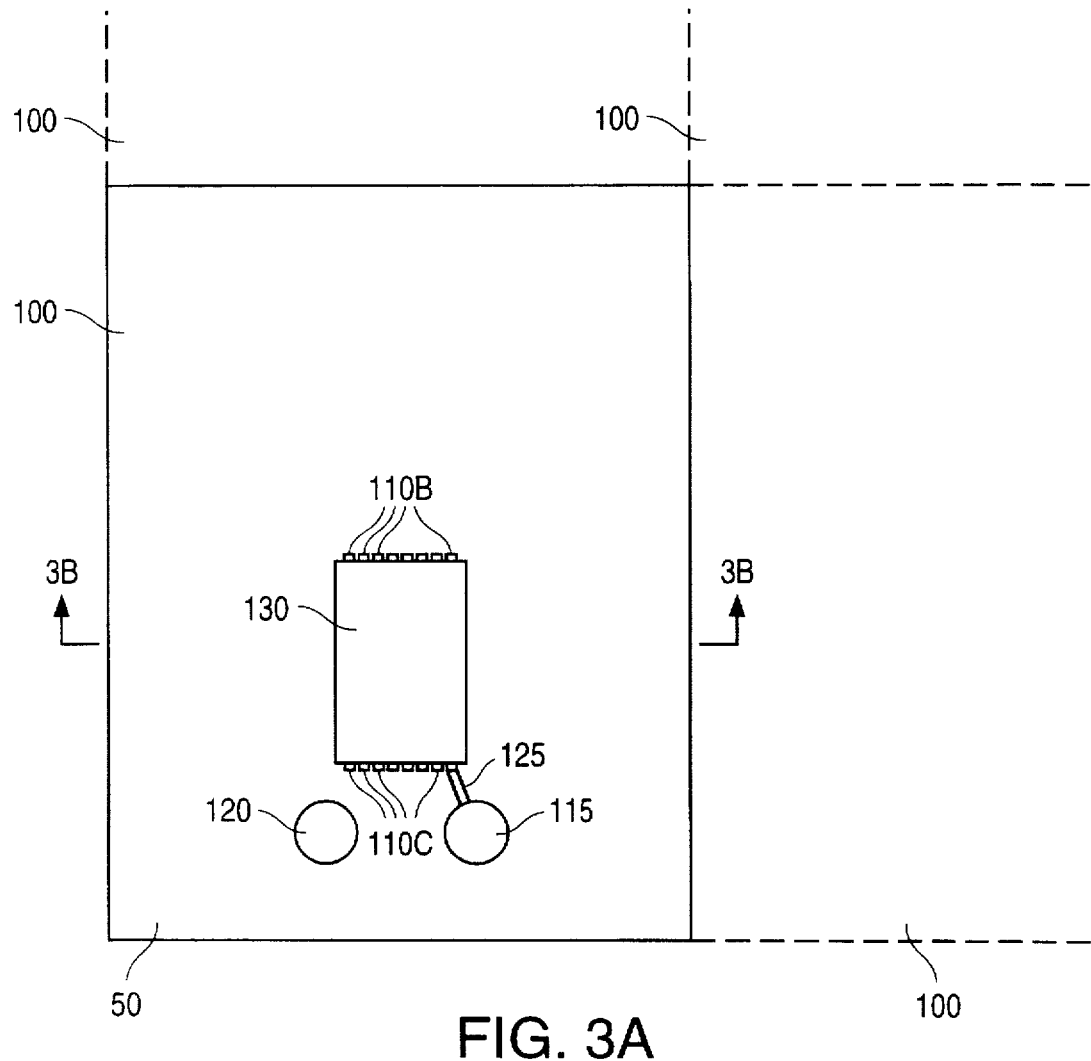
FIG. 3A is a plan view of the head after an insulative layer has been formed on the lower coil member.
Figure 3B:
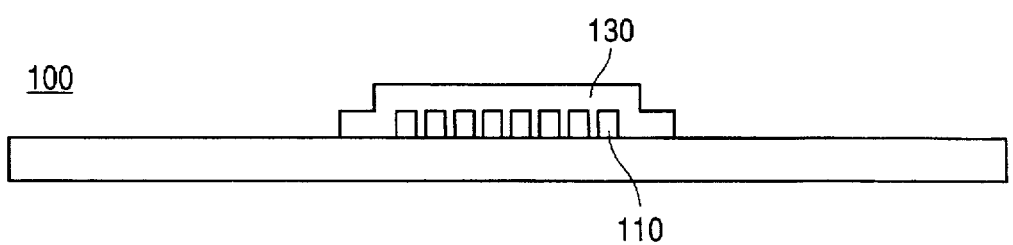
FIG. 3B is a cross section of the head of FIG. 3A taken along section line 3B—3B.

An electrically insulative layer 130 is formed above lower coil member 110 as shown in FIG. 3A. Insulative layer 130 is sized to cover lower coil member 110 except for the ends 110B and 110C of the coil elements thereof. One way to form insulative layer 130 is to coat the upper surface of the partially formed head 100 of FIG. 2C with photoresist. The photoresist is then photographically patterned to form a protective photoresist insulative layer 130 above lower coil member 110 as illustrated in the top plan view of FIG. 3A and in FIG. 3B which is a cross section of head 100 of FIG. 3A taken along section line 3B—3B. To accelerate curing of the photoresist used to form insulative layer 130, E-beam curing of the photoresist is employed. Exposing the photoresist to an E-beam for a time within the range of approximately 20 minutes to approximately 40 minutes is found to produce acceptable curing results.

Figure 4C:
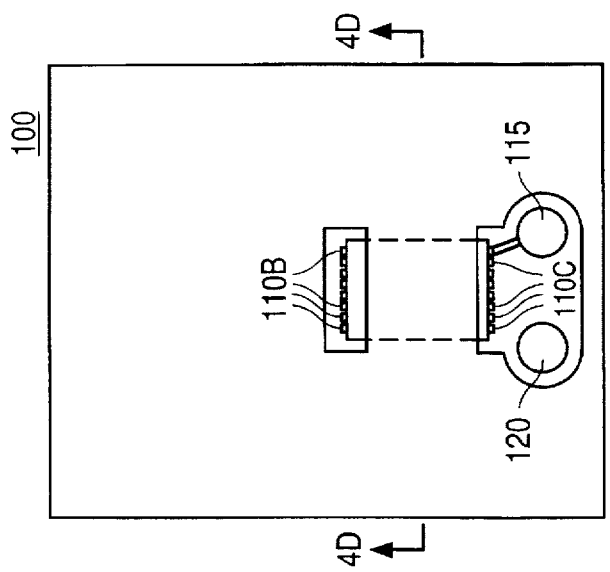
FIG. 4A–4C show plan views of process steps in the formation of a seed layer on the head.
Figure 4B:
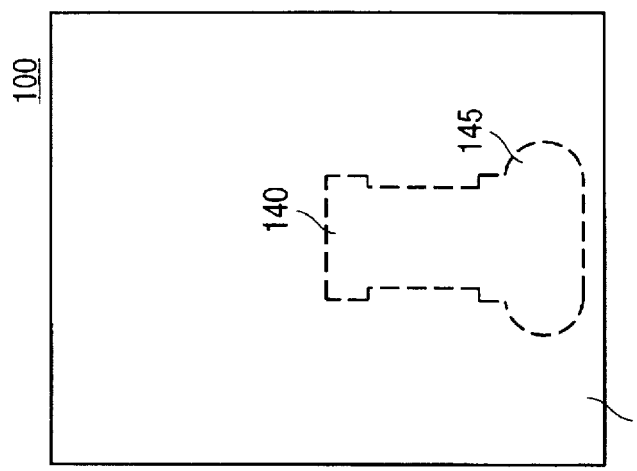
Figure 4A:
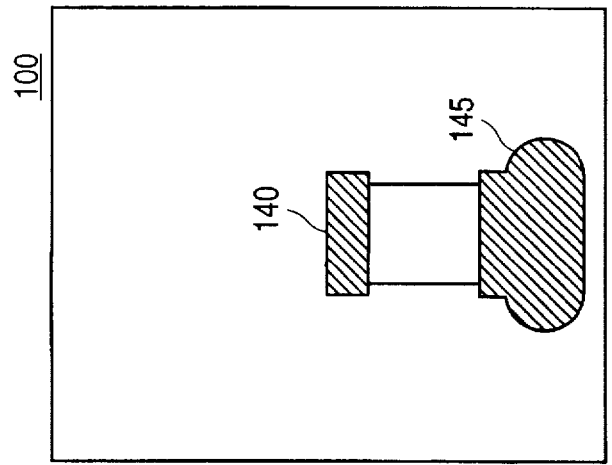

A "lift-off" process is now used to pattern an electrically conductive seed layer 135 on the partially formed head 100 as show in FIGS. 4A–4B. As part of this process, a protective layer of photoresist is patterned on those portions of head 100 on which seed layer 135 is not to be formed. More particularly, as shown in FIG. 4A, the ends 110B of lower coil member 110 are covered by a temporary protective element of photoresist 140. In addition, the ends 110C of lower coil member 110 and also coil connecting pads 115 and 120 are covered by another temporary protective element of photoresist 145. Seed layer 135 is then formed on the resultant structure as shown in FIG. 4B. For example, an electrically conductive, nonmagnetic material such as Cr-NiV is sputtered on the upper surface of head 100 as shown in FIG. 4B to form seed layer 135. In one embodiment, seed layer 135 is sputtered chrome (Cr) or other adhesion-promoting layer followed by a sputtered non-magnetic nickel-vanadium (NiV) 7% film, for example. Seed layer 135 includes a chrome (Cr) portion which exhibits a thickness within the range of approximately 200 Å to approximately 400 Å. Seed layer 135 also includes a Nickel Vanadium (NiV) portion which exhibits a thickness within the range of approximately 1000 Å to approximately 1500 Å. In FIG. 4B, dashed lines are used to indicate some of structures which are situated below seed layer 135.

Figure 4D:
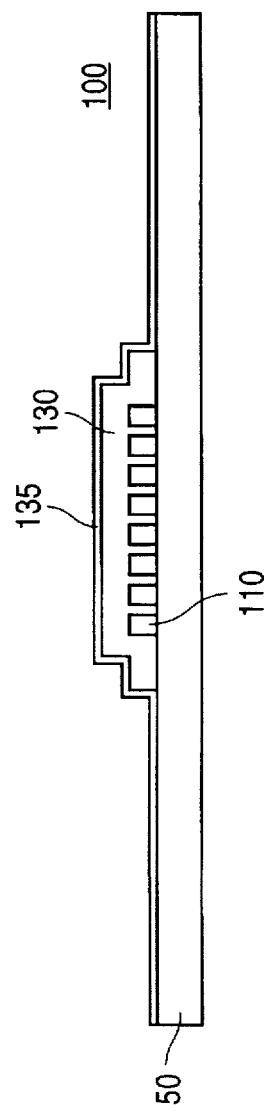
FIG. 4D is a cross section of the head of FIG. 4C taken along section line 4D—4D.

Photoresist layers 140 and 145 are now "lifted-off" head 100. To accomplish this lift-off, the partially complete head 100 of FIG. 4B is placed in an ultrasonic bath including a photoresist solvent such as acetone, for example. The seed layer 135 is sufficiently thin such that it does not cover photoresist layers 140 and 145 very well. In this manner, there are sufficient avenues of attack by which the solvent can get through seed layer 135 in the region of photoresist layers 140 and 145 to dissolve these photoresist layers. When photoresist layers 140 and 145 are thus dissolved, the portions of seed layer 135 immediately above photoresist layers 140 and 145 lift-off and float away. The region of head 100 immediately surrounding coil ends 110B is thus void of seed layer 135 as shown in FIG. 4C. Similarly, the region of head 100 immediately surrounding coil ends 110C and coil connecting pads 115 and 120 is also void of seed layer 135. FIG. 4D provides a cross-sectional view of the partially complete head 100 taken along section line 4D—4D, namely though lower coil member 110.

Figure 5A:
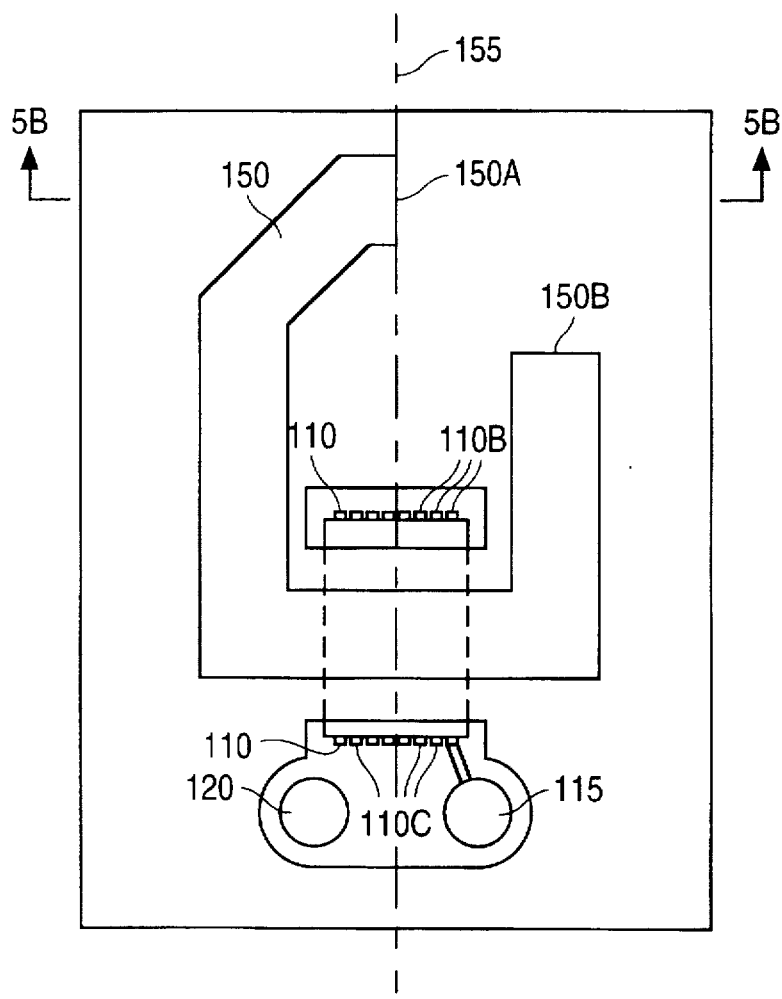
FIG. 5A is a plan view of the head after a first magnetic core member is plated on the head.

A first magnetic core member 150 is formed on the surface of partially complete head 100 as shown in FIG. 5A. First magnetic core member 150 is shaped to extend between ends 110B and 110C of lower coil member 110. Core member 150 includes ends 150A and 150B, of which end 150B will be designated as gap end 150A. End 150A forms the first pole of head 100.

Figure 5B:
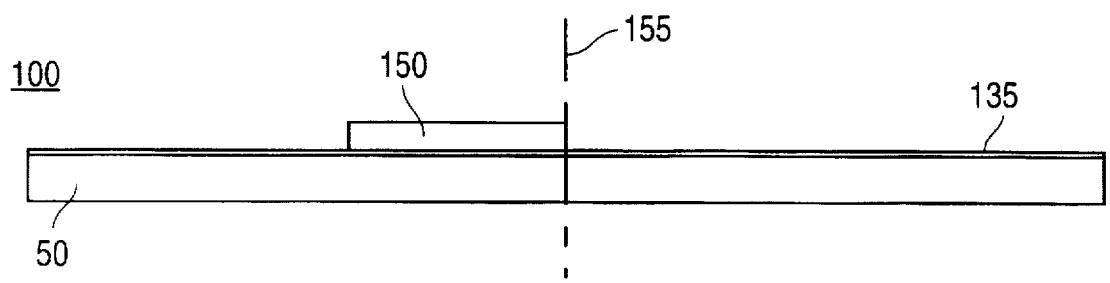
FIG. 5B is a cross section of the head of FIG. 5A taken along section line 5B—5B.

To form first magnetic core member 150, a layer of photoresist (not shown) is patterned on head 100. This photoresist layer includes an opening where core member 150 is to be located as indicated in FIG. 5A. Plateable magnetic material such as NiFe is then plated in the opening in the photoresist layer using seed layer 135 as a seed. The photoresist layer is then removed as described earlier, leaving the structure shown in FIG. 5A and 5B. FIG. 5B is a cross-sectional view of the partially complete head 100 of FIG. 5A taken along section line 5B—5B. In FIGS. 5A and 5B, the centerline of head 100 is indicated as centerline 155.

Figure 6A:
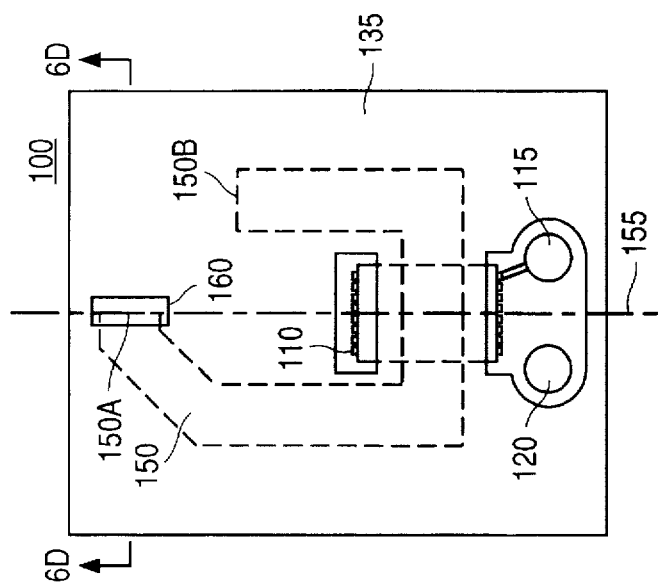
FIG. 6A–6C show plan views of process steps in the formation of a diamond-like carbon (DLC) gap region of the head.
Figure 6B:
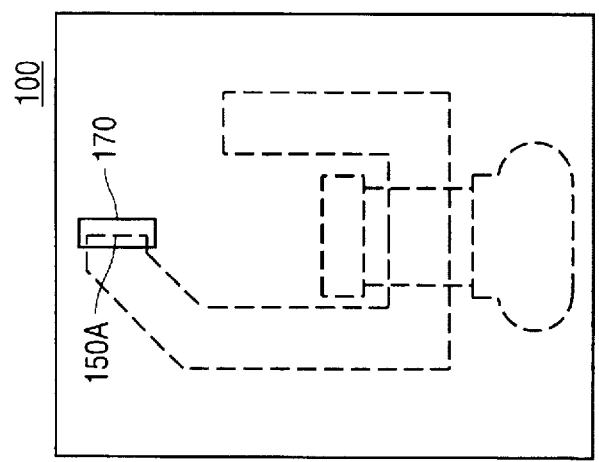

To provide the poles of head 100 with protection against head wear, a gap region 160 of hard durable material, such as diamond-like carbon (DLC),for example, is formed at gap end 150A of core member 150 as shown in FIGS. 6A–6D. It is noted that gap 160 should be fabricated from a non-conductive material, such as DLC. In more detail, to form this DLC gap region, the entire surface of the partially complete head 100 is covered with a layer 165 of diamond-like carbon material as shown in FIG. 6A. One way of forming DLC layer 165 is by chemical vapor deposition (CVD), the process of which is described in more detail later. The thickness of DLC layer 165 is within the range of approximately 0.2 μ to approximately 1.0μ. In FIGS. 6A–6B, dashed lines are used to indicate structures below diamond-like carbon layer 165 which would not otherwise be visible.

Figure 6C:
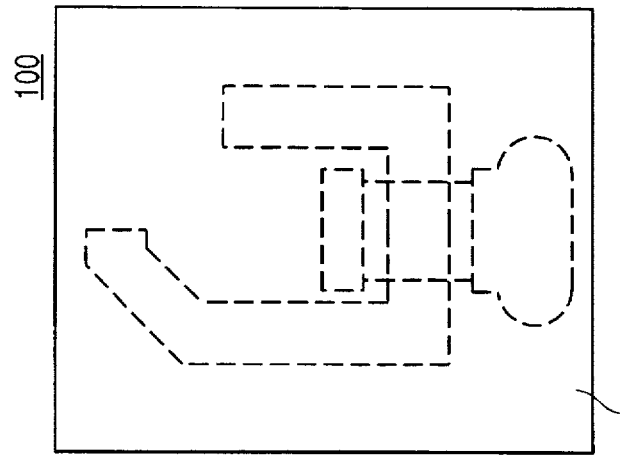

After DLC layer 165 is formed on the surface of head 100 as shown in FIG. 6A, a protective element 170 of photoresist is formed on the upper surface of partially complete head 100 at gap end 150A as shown in FIG. 6B. In one embodiment, the photoresist element 170 exhibits rectangular dimensions of approximately 5μ by approximately 50μ. Head 100 is then subjected to a reactive ion etch which removes DLC layer 165 from all of head 100 except for the portion of head 100 protected by photoresist element 170. Photoresist element 170 is then removed by a photoresist solvent such as acetone, thus leaving a DLC gap region 160 as shown in FIG. 6C. DLC gap region 160 is shown in more detail in the cross sectional view of FIG. 6D which is taken along section line 6D—6D of FIG. 6C.

DLC fabricated in this manner results in a DLC layer 165 with a Knoop hardness of approximately 800. It is found that DLC layer Knoop hardnesses of greater than 700 up to approximately 2000 Knoop produce an acceptably hard layer 165 for wear protection purposes. More specifically, a suitable hardness range for layer 165 is in the range of from approximately 800 Kg/mm$^2$ (Knoop) to approximately 2000

Kg/mm² (Knoop). DLC wear layer 165 is then reactive ion etched as described to form DLC wear layer to form DLC gap region 160.

Figure 6D:
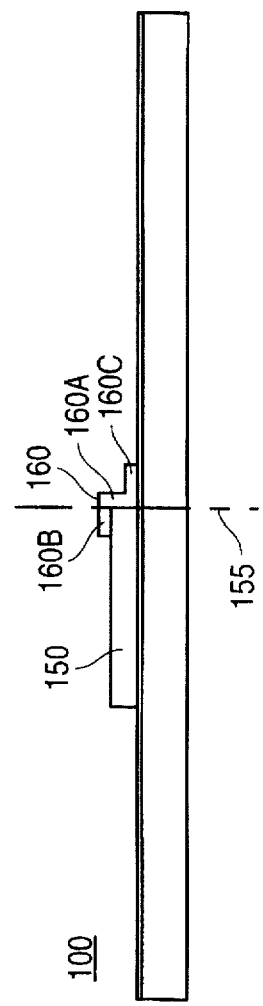
FIG. 6D is a cross section of the head of FIG. 6C taken along section line 6D—6D.

As seen in FIG. 6D, DLC gap region 160 exhibits a substantially Z-like shape in this particular embodiment. In other words, DLC gap region includes a substantially vertical member 160A from which ends 160B and 160C extend as illustrated. DLC end 160B overlaps onto core member 150 and DLC end 160C overlaps onto seed layer 135. With more precise masking and positioning of photoresist layer 170 adjacent gap end 150A, it is possible to reduce the overlap of DLC end 160B onto core member 150 and DLC end 160C onto seed layer 135 at the other. In this manner, the shape of DLC gap region 160 can exhibit a more vertical, substantially rectangular shape. This overlap of gap material onto the core does not negatively impact the performance of the resultant head.

Figure 7A:
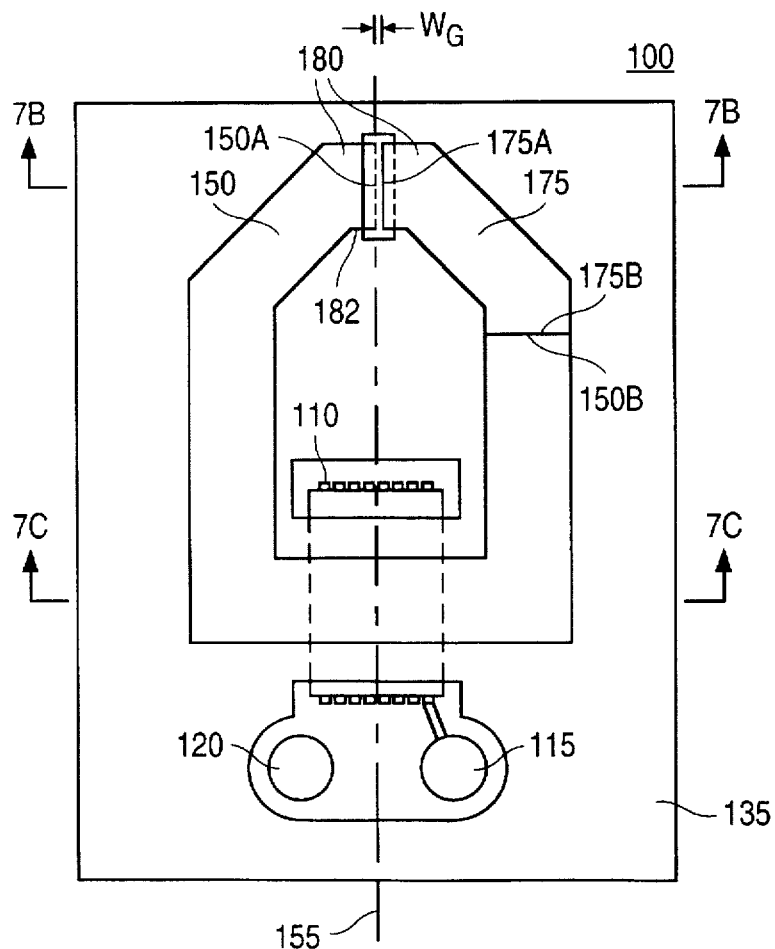
FIG. 7A is a plan view of the head after a second magnetic core member is plated on the head.

A second magnetic core member 175 is formed on partially complete head 100 as shown in FIG. 7A. Second magnetic core member 175 includes ends 175A and 175B. End 175B contacts and magnetically couples to end 150B of first magnetic core 150. In actual practice, end 175B overlaps end 150B by up to approximately 3μ in the present embodiment to insure connection and to allow for masking tolerances. The remaining end 175A of second magnetic core member 175 is situated adjacent DLC gap region 160 as shown. First magnetic core member 150 and second magnetic core member 175 thus together form a completed, substantially ring-shaped magnetic core 180. The first pole of core 180 is formed by gap end 150A and the second pole of core 180 is formed by gap end 175A. The gap width, $W_G$, is defined to be the width of gap region 160, namely the distance the first pole at gap end 150A and the second pole at gap end 175A. In other words, the horizontal dimension of vertical member 160A (see FIG. 7A) is the gap width of the head. Typical gap widths for head 100 are approximately 0.2 microns to approximately 1 micron. Magnetic core 180 includes a throat 182 at the inner vertex of the first magnetic core member 150 and second magnetic core member 175 as shown in FIG. 7A.

One way to form second magnetic core 175 on head 100 is to coat head 100 with a layer of photoresist (not shown). The layer of photoresist is patterned to include an opening at the location of head 100 where second magnetic core 175 is to be formed as indicated in FIG. 7A. Magnetic material such as NiFe is then plated in the opening in the photoresist layer. Seed layer 135 is used as the seed layer for this plating step. Upon completion of plating, the photoresist layer is removed with a photoresist solvent, thus leaving second magnetic core 175 as shown in FIG. 7A.

Figure 7B:
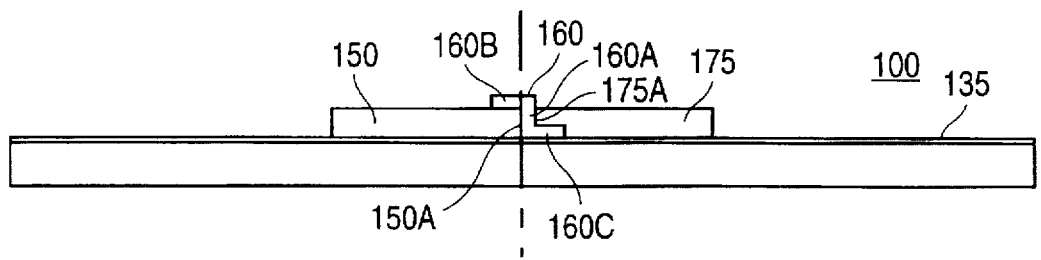
FIG. 7B is a cross section of the head taken along section line 7B—7B.

FIG. 7B shows a cross section of head 100 of FIG. 7A taken along section line 7B—7B, namely through the gap region of partially complete head 100 at this stage in fabrication. Core 180 exhibits a thickness within the range of approximately 2μ to approximately 8μ at this stage in fabrication. It is noted that seed layer 135 need not be removed. However, for simplicity, seed layer 135 is not shown in the subsequent drawings.

Figure 7C:
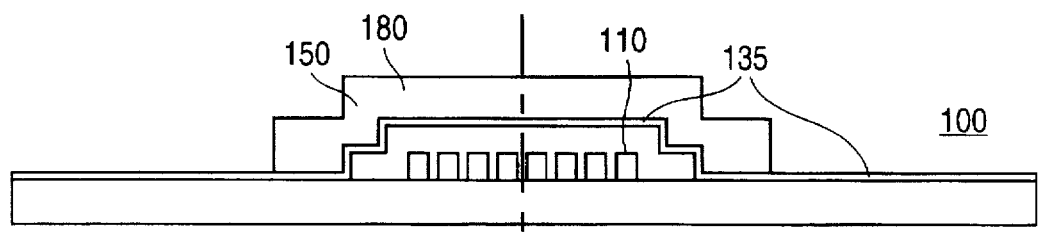
FIG. 7C is a cross section of the head taken along section line 7C—7C.

FIG. 7C is a cross section of head 100 of FIG. 7A taken through the coil region, namely through section line 7C—7C. It is again noted that seed layer 135 need not be removed. However, for simplicity, seed layer 135 is not shown in the subsequent drawings.

Figure 8A:
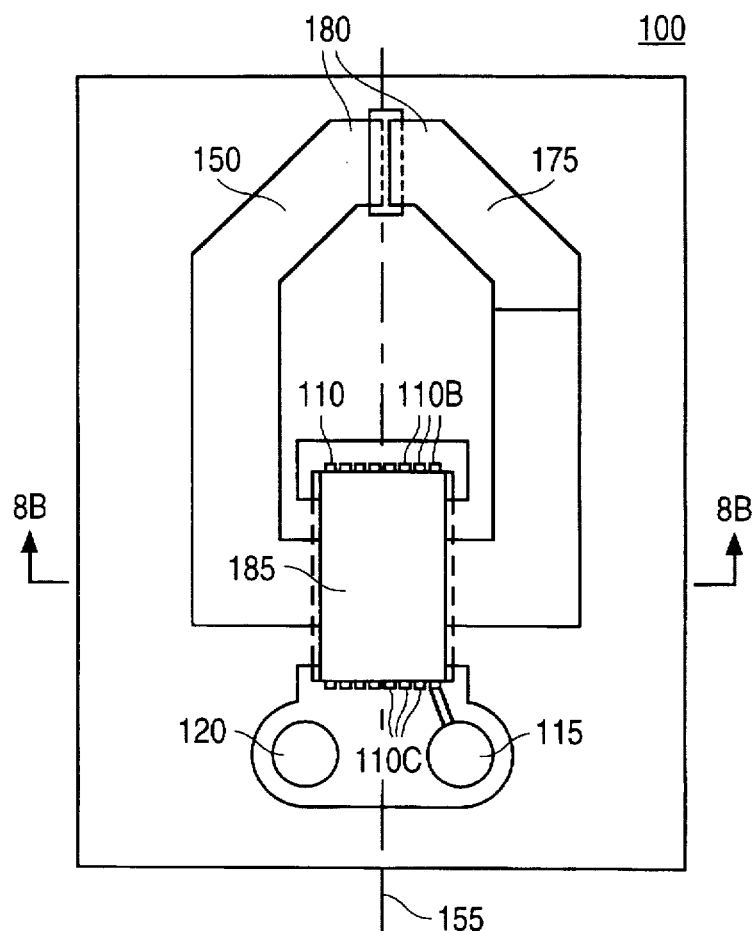
FIG. 8A is a plan view of the head after an insulative layer is formed in the coil region.
Figure 8B:
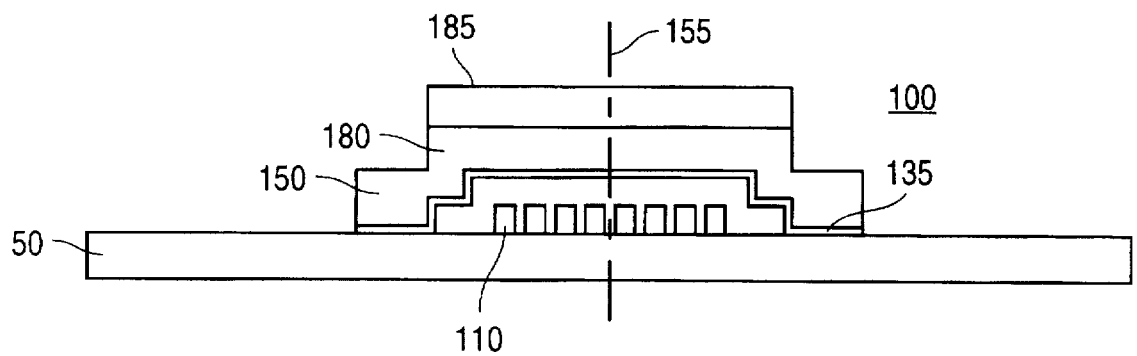
FIG. 8B is a cross section of the head taken along section line 8B—8B.

An electrically insulative layer 185 is formed above lower coil member 110 and first magnetic core member 150 as shown in FIG. 8A. Insulative layer 185 is sized to cover lower coil member 110 except for the ends 110B and 110C of the coil elements thereof. Insulative layer 185 is formed by coating the upper surface of the partially formed head 100 with photoresist. The photoresist is then photographically patterned to form a protective photoresist insulative layer 185 above lower coil member 110 as illustrated in the top plan view of FIG. 8A and in FIG. 8B. FIG. 8B is a cross section of head 100 of FIG. 8A taken along section line 8B—8B, namely through the coil region. To accelerate curing of the photoresist used to form insulative layer 185, E-beam curing of the photoresist is employed. Exposing the photoresist to an E-beam for a time within the range of approximately 20 minutes to approximately 40 minutes is found to produce acceptable curing results.

Figure 9A:
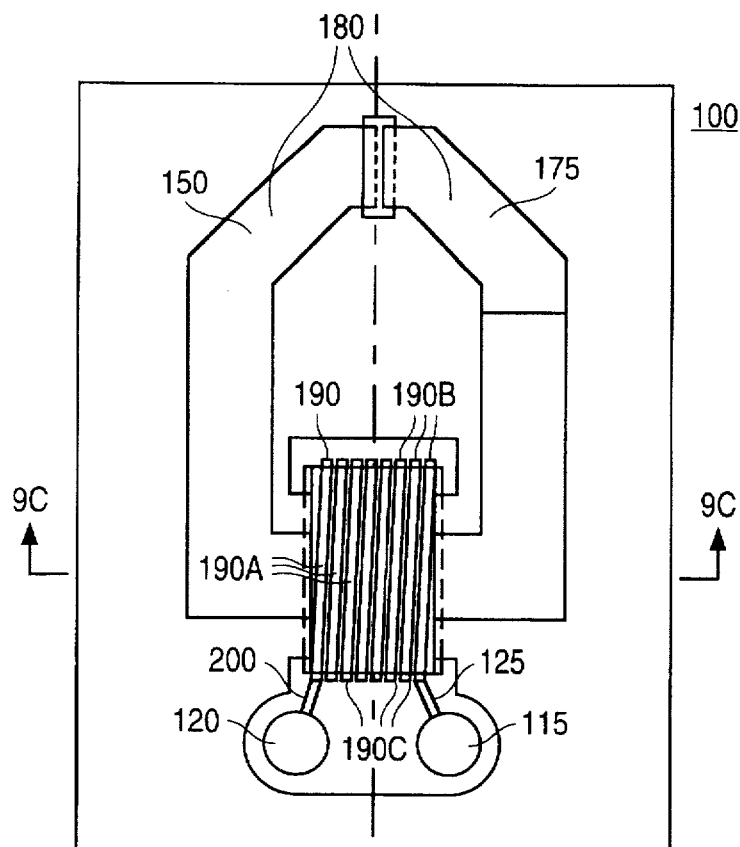
FIG. 9A is a plan view of the head after an upper coil member is formed in the coil region and after the seed layer for the coil is removed.
Figure 9B:
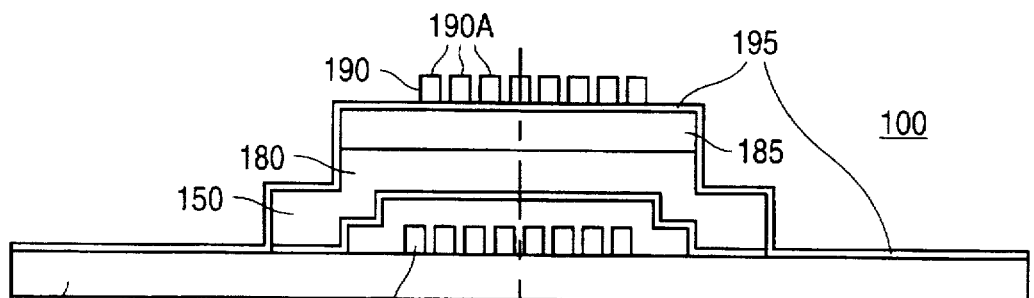
FIG. 9B is a cross section of the head through the coil region prior to removal of the seed layer.
Figure 9C:
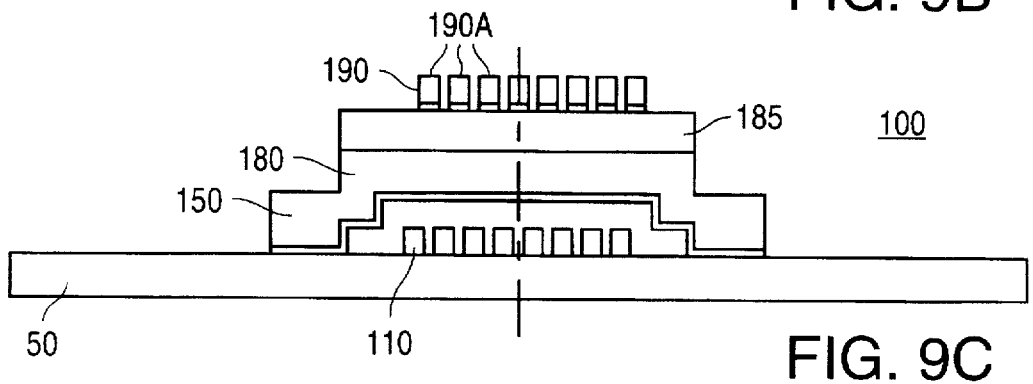
FIG. 9C is a cross section of the head of FIG. 9A taken along section line 9C—9C after the seed layer for the coil is removed.

An upper coil member 190 is now formed on partially complete head 100 as shown in FIGS. 9A–9C. Upper coil member 190 includes a plurality of coil elements 190A having opposed ends 190B and 190C. Each end 190B of coil elements 190A mates up and electrically connects to a corresponding end 110B of coil elements 190A therebelow. Similarly, each end 190C of coil elements 190A mates up and electrically connects to a corresponding end 110C of coil elements 190A therebelow. Each of upper coil elements 190A is slightly angled as shown in FIG. 9A to form a substantially helically-shaped coil when coupled to lower coil elements 110A.

One way to form upper coil member 190 is to deposit a seed layer 195 of electrically conductive material such as CrCu atop partially complete head 100 as shown in FIG. 9B. For example, CrCu is sputtered on head 100 to form seed layer 195. In this particular embodiment, seed layer 195 is relatively thin and exhibits a thickness within the range of approximately 200 Å to approximately 400 Å of sputtered Cr followed by approximately 500 Å to approximately 1000 Å of sputtered Cu. A layer of photoresist (not shown) is coated on seed layer 195. This photoresist layer is then patterned using conventional photolithographic techniques to cover the entire surface of seed layer 195 except for openings at the locations where the coil elements 190A of upper coil member 190 are to be formed. Head 100 is then subjected to a plating bath of copper. Copper is thus plated in the openings of the photoresist layer to form upper coil member 190. The thickness of coil member 190 is within the range of approximately 3μ to approximately 3.5μ at this stage.

The partially formed head 100 of FIG. 9B is then subjected to an etchant to remove seed layer 195. The same etchant which is used to remove seed layer 105 of FIG. 2C may be used. In the course of removing seed layer 105, approximately 0.05 Å of lower coil member 110 is also removed. However, this is such a small portion of the overall thickness of lower coil member 110 that the coil's performance is not affected. For simplicity in the subsequent drawings, the portion of seed layer 195 which is left remaining under coil elements 190A of upper coil member 190 is not shown. It is noted that at the same time that upper coil member 190 is formed, coil connective element 200 is formed by the same photolithographic/plating technique. Coil connective element 200 couples upper coil member 190 to coil connecting pad 120. Together, lower coil member 110 and upper coil member 190 form a complete coil which is effectively wound around magnetic core 180. The ends of the coil thus formed are coupled to connective pads 115 and 120 as shown in FIG. 9A. It is noted that FIG. 9A depicts partially complete head 100 after coil formation is complete and after seed layer 195 is removed. FIG. 9C is a cross section of the head 100 taken along section line 9C—9C, namely though the coil region of the head of FIG. 9A.

Figure 10A:
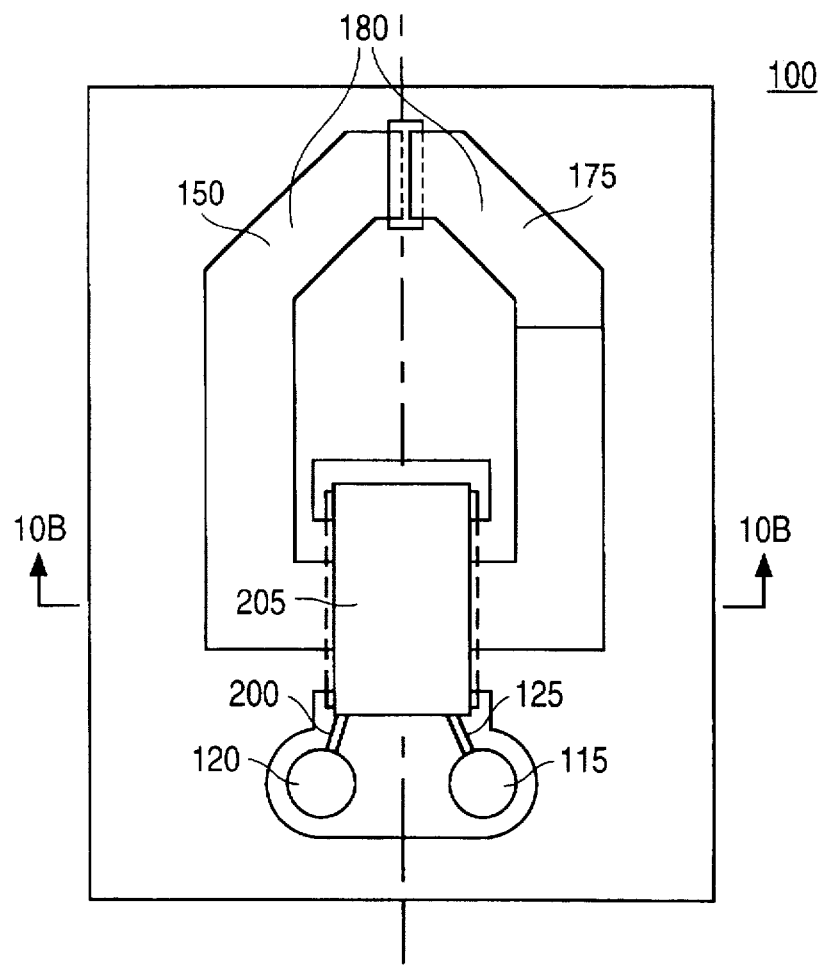
FIG. 10A is a plan view of the head after formation of a protective insulative layer atop the upper coil member.
Figure 10B:
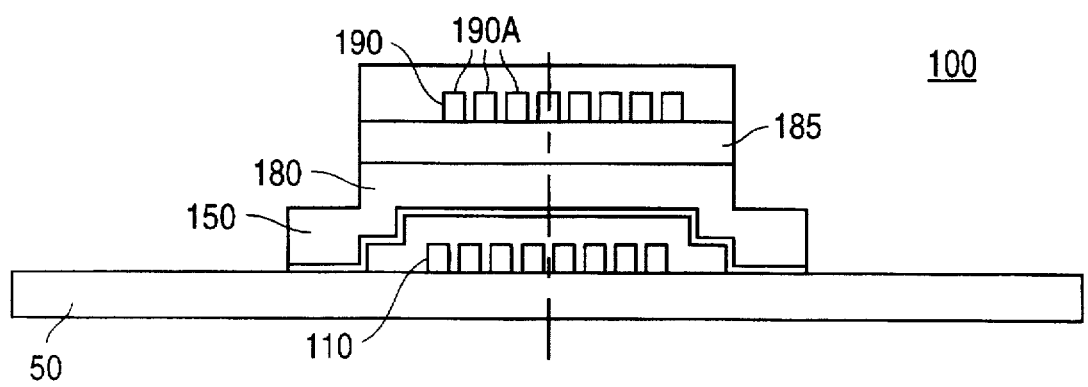
FIG. 10B is a cross sectional view of the head of FIG. 10A taken along section line 10B—10B.

A protective electrically insulative layer 205 is formed above upper coil member 190 as shown in FIG. 10A–10B. Insulative layer 205 is sized to cover electrically insulative layer 185 and upper coil elements 190. Insulative layer 205 is formed by coating the upper surface of the partially formed head 100 with photoresist. The photoresist is then photographically patterned in substantially the same manner as insulative layer 130 to form a protective photoresist insulative layer 205 above upper coil member 190 as illustrated in the top plan view of FIG. 10A and the cross section of FIG. 10B. In this manner, coil elements 190 are protected from potential shorts.

Figure 11A:
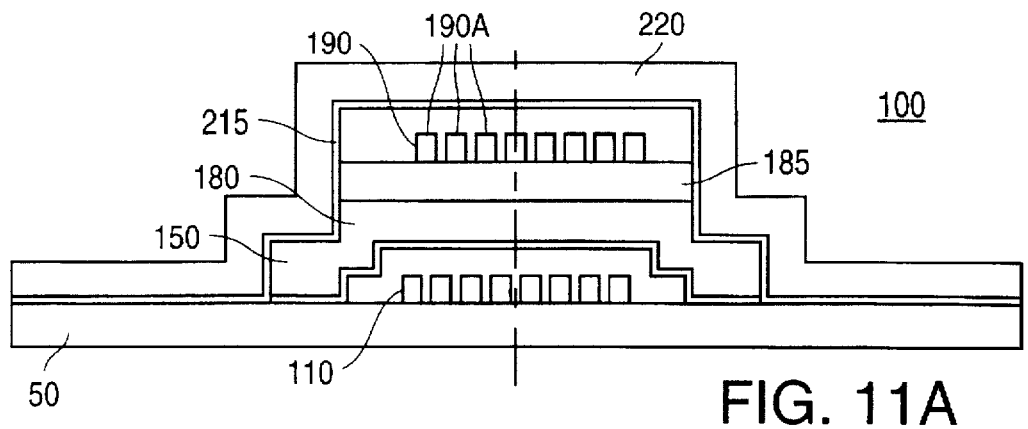
FIG. 11A is a cross sectional view of the head through the coil region after deposition of a protective DLC layer.
Figure 11B:
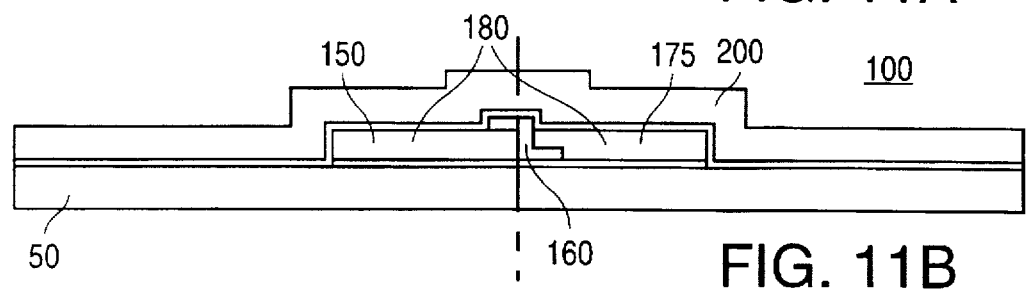
FIG. 11B is a cross sectional view of the head through the gap region after deposition of a protective DLC layer.
Figure 11C:
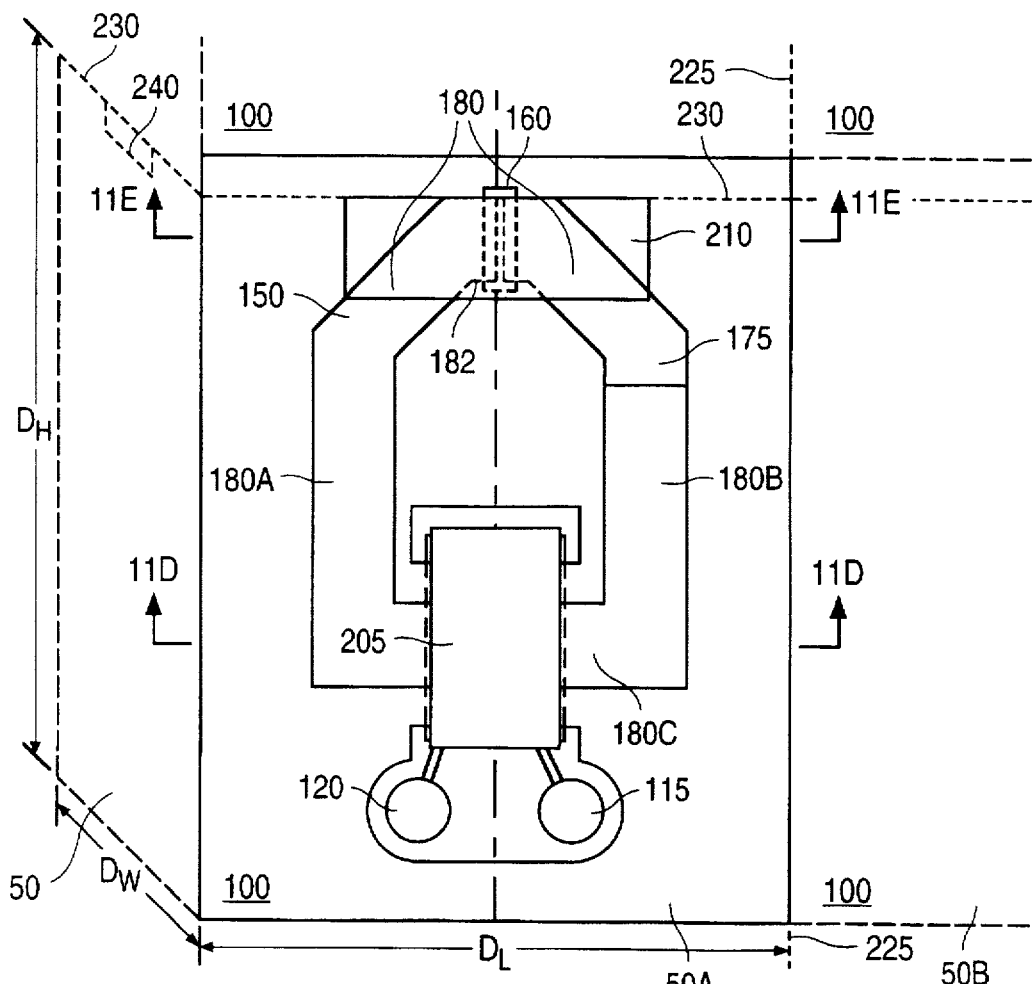
FIG. 11C is a plan view of the head after deposition of a DLC layer and after selective removal of portions of the DLC layer to form a DLC protective member.

To provide head 100 with durability in gap region 160, a diamond like carbon (DLC) hard protective member 210, fabricated from a hard material such as diamond like carbon (DLC), is situated atop magnetic core 180 adjacent gap region 160 (see FIG. 11C). To form such DLC protective member 210, a layer 220 of DLC material is deposited atop the upper surface of partially complete head 100 as seen in FIGS. 11A and 11B.

More detail is now provided with respect to the formation of DLC protective member 210. DLC is not true diamond, but rather an allotrope of carbon containing diamond crystallites and graphitic carbon. Care is taken to form the DLC layer 220 with a suitable hardness but without creating undue stresses that tend to damage the integrity of the head structure. Before DLC layer 220 is actually laid down on its silicon adhesion layer 215, the adhesion layer is sputter cleaned. In the course of performing this sputter cleaning, approximately 200 Å of the upper surface of the silicon adhesion layer is removed. More particularly, the silicon adhesion layer 215 is sputter cleaned in a SAMCO plasma machine, Model No. PD-200D (Plasma Enhanced CVD System For DLC Deposition and Etching), hereafter the "plasma machine". This sputter cleaning is performed with Argon in a plasma within the plasma machine vessel at a pressure of 70 mTorr with 180 watts RF input power at a frequency of 13.56 MHz. The flow rate of Argon is approximately 100 sccm. The partially complete head 100 is situated on a 6 inch diameter cathode (ie. the energized electrode) of the SAMCO plasma machine, Model PD-200D, for approximately 3 to approximately 4 minutes.

Immediately after the Argon plasma cleaning (sputter etching) is complete, the input power is reduced to 110–150 Watts to the same 6 inch cathode electrode. The Argon source is turned off and a source of liquid hydrocarbon DLC source material is turned on. For example, one DLC source material that may be used is Part No. S-12 available from SAMCO, Sunnyvale, Calif. The pressure within the vessel is approximately 20–approximately 25 mTorr at a flow rate of source material of approximately 25 cm$^3$/min. Although the temperature is not specifically controlled during this process, the wafer on which the head is fabricated is situated on a water-cooled cathode while in the plasma machine. Under these conditions, a DLC deposition rate of approximately 1000 Å/min is obtained which is maintained until the desired DLC thickness is reached, namely approximately 5µ. It is noted that substantially the same DLC chemical vapor deposition process as described above is also used to form DLC gap region 160 except that for the relatively thin DLC layer 160, it has been found that a silicon adhesion layer can be omitted if desired.

This chemical vapor deposition process is used to form DLC layer 220 up to a depth of approximately 5 microns. In this manner, as viewed from the side in cross section, as in FIG. 11B, a substrate (hard material), magnetic core (soft material), DLC protective member (hard material) sandwich is formed which protects the relatively soft magnetic core therein from wear. Although a portion of the DLC member 210 is removed from the sandwich during a subsequent lapping step, the remaining portions of DLC member 210 in conjunction with the hard substrate 50 bound the soft magnetic material of the magnetic core 180 on all sides, thereby protecting it from wear. The hardness of DLC protective member 210 and the hardness of substrate 50 are selected to be substantially greater than the hardness of magnetic core 180. For example, the hardness of magnetic core 180 (NiFe) is approximately 400 Kg/mm$^2$ Knoop. In contrast, in this particular embodiment, the hardness of DLC protective member 210 is approximately 2000 Kg/mm$^2$ Knoop and the hardness of the alumina substrate 50 is approximately 2000 Kg/mm$^2$ Knoop. Generally the hardness of DLC member 210 is selected to be greater then approximately 700 Knoop and up to approximately 2000 Knoop. More specifically, the hardness of DLC member 210 is selected to be within the range of approximately 800 Knoop to approximately 2000 Knoop. While other materials may be selected for substrate 50 and protective member 210, it will be appreciated that the hardness of these materials is substantially greater than the hardness of the relatively soft magnetic material employed for the magnetic core.

In summary, to form DLC layer protective member 210 from DLC layer 220, a relatively thin silicon adhesion layer 215 is first sputtered on the entire upper surface of head 100 as shown in FIGS. 11A and 11B. Silicon adhesion layer 215 typically exhibits a thickness within the range of approximately 400 Å to approximately 1000 Å. Silicon adhesion layer exhibits a nominal thickness of approximately 600 Å in a preferred embodiment. A DLC layer 220 is then deposited over silicon adhesion layer 215. Silicon adhesion layer 215 enables DLC layer 220 to stick to the upper surface of head 100. FIG. 11A is a cross section through the coil region of head 100 after formation of silicon adhesion layer 215 and DLC layer 220. FIG. 11B is a cross section through the gap region of head 100 after formation of silicon adhesion layer 215 and DLC layer 220.

To actually form DLC protective member 210 from DLC layer 220, head 100 is coated with a layer of photoresist (not shown). The photoresist is patterned (masked, exposed to light and cured) such that only photoresist remains in the area of head 100 at which DLC protective member 210 is to be present as indicated in FIG. 11C. Photoresist is removed from the remainder of head 100 except for that present at the region which is to become DLC protective member 210, which in this particular example exhibits a substantially rectangular geometry. Head 100 is then subjected to an $O_2$ reactive ion etch which removes all DLC from the DLC layer 220 of head 100 except for the portion of DLC layer 220 protected by the photoresist layer. The portion of DLC layer 220 which was protected by photoresist remains and forms DLC protective member illustrated in FIG. 11C. A similar reactive ion etch using 80–90% $CF_4$ and 20–10% $O_2$ also removes the exposed portion of silicon adhesion layer 215. DLC protective member 210 typically exhibits a thickness within the range of approximately 4µ to approximately 8µ and a nominal thickness of approximately 5µ in a preferred embodiment.

Coil connective pads 115 and 120 are gold plated to enhance their electrical connection properties. To achieve such gold plating, head 100 of FIG. 11C is covered with a Cr-Cu or Cr-Au seed layer (not shown). The head is then patterned with a layer of photoresist to include openings at the locations of pads 115 and 120. The head is then gold plated such that pads 115 and 120 are plated up with gold while the remainder of head 100 remains unaffected due to the protection afforded by the photoresist layer. The seed layer is then removed by suitable chemical etching.

FIG. 11C shows magnetic core 180 as including substantially parallel side core members 180A and 180B. Magnetic core 180 also includes a lower core member 180C which joins side core members 180A and 180B. Whereas in the particular embodiment shown in FIG. 11C, the coil formed by lower coil member 110 and upper coil member 190 is wound around lower core member 180C, this coil can alternatively be wound around side core members 180A or 180B. The location of coil connecting pads 115 and 120 can be moved to be adjacent the new location of the coil if desired.

FIG. 11C is drawn to show a partially formed head 100 in solid black line and a plurality of adjacent neighboring heads 100 on the same substrate are indicated by dashed lines. It will be recalled that numerous heads 100 can be fabricated simultaneously side by side on the same substrate. When this stage of fabrication is reached, all of the heads 100 on the substrate are diced up into individual slices which are further machined to form sliders with the head being situated on the third axis of the slider. The head in this instance is an integral part of the slider.

The head 100 shown in black line in FIG. 11C is cut away from the other heads 100 by cutting along cut line 225 and cut line 230. Cut line 230 abuts DLC protective member 210 and cuts into the gap region so as to expose the gap region for recording and playback purposes. Cut line 230 is an initial rough cut on a row of heads. In actual practice, the gap region of head 100 is lapped back from cut line 230 to a distance within approximately 1μ of throat 182 of magnetic core 180.

Figure 11D:
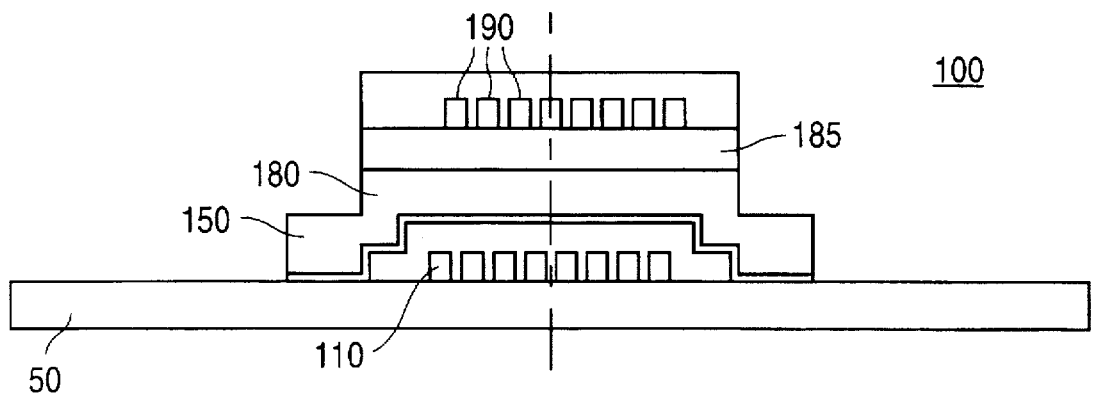
FIG. 11D is a cross sectional view of the head of FIG. 11C taken along section line 11D—11D.
Figure 11E:
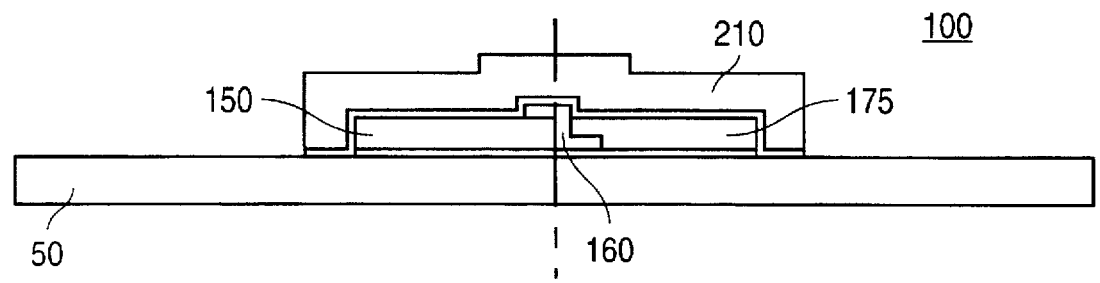
FIG. 11E is a cross sectional view of the head of FIG. 11D taken along section line 11E-11E.

FIG. 11D is a cross section of the head of FIG. 11C after cuts have been made along the prescribed cut lines. This cross section is taken along section line 11D—11D of FIG. 11C, namely through the coil member. FIG. 11E is a cross section of the head of FIG. 11C again after cuts have been made along the prescribed cut lines, except that this cross section is taken through the gap region along section line 11E—11E. Thus, FIG. 11E is a cross section which faces the magnetic recording media.

Figure 12:
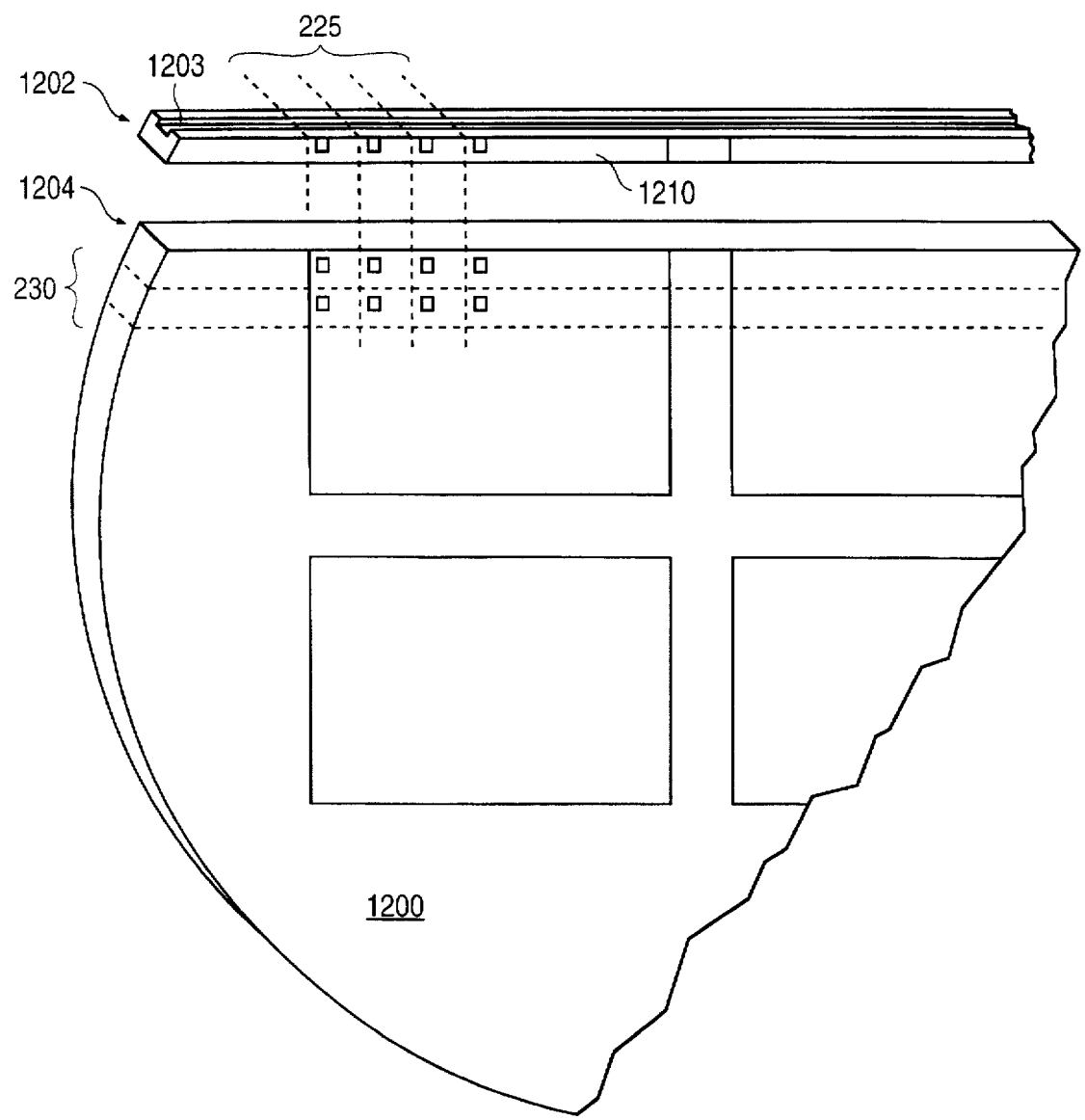
FIG. 12 is a perspective view of a plurality of head/slider assemblies fabricated from a common substrate.

As mentioned above, a plurality of heads 100 are formed by cutting along cut lines 225 and cut lines 230 across substrate 50. (FIG. 11C is not drawn to scale.) As seen in the representation of a wafer 1200 in FIG. 12, first, a cut is made across the entire wafer 1200 using a diamond saw to form edge 1202, as shown. Note that FIG. 12 is not drawn to scale. Then a groove 1203 is machined into edge 1202 with the remaining material eventually forming the air bearing surface of the slider. The edge 1202 of the wafer 1200 is lapped to form the "media side" of all of the sliders disposed on the edge 1202. A second cut is made along the next of the cut lines 230 to form a sliver 1210 of wafer and to expose a new edge 1204 of the wafer 1200. The sliver 1210 is then precision cut using a diamond saw along the cut lines 225, which results in a number of individual slider units like 235 shown in FIGS. 13A and 13B. As seen in the close-up perspective view of head/slider assembly 235 of FIG. 13A, the coil is oriented on the lowermost portion of the magnetic core. In an alternative embodiment shown in FIG. 13B, the coil is oriented on the rightmost arm of the core. Bonding pads 239A and 239B are shown which are coupled to the coil portion of the head. The coil may be mounted at different locations around the circumference of the core. Moreover, the gap region of the core need not be centered on the core, but may alternatively be asymmetric as shown in FIG. 13B.

In actual practice, the lateral dimension $D_L$, of the substrate portion 50A on which head 100 is located is significantly longer than it appears in FIG. 11C. In accordance with one embodiment, the lateral dimension, $D_L$, of substrate portion 50A is sufficiently long such that substrate portion 50A and head 100 together form an integral head/slider assembly 235. A close-up perspective view of one head/slider assembly 235 is shown in FIGS. 13A and 13B.

The lateral dimension, $D_L$, of substrate portion 50A, adjacent substrate portion 50B and other like substrate portions is approximately 2200μ in this particular example. It should be appreciated that this value will vary according to the particular application of the head/slider assembly. Head slider assembly 235 exhibits a width, $D_W$, of approximately 1680μ and a height, $D_H$, of approximately 500μ in this particular example. It should be appreciated that these $D_L$, $D_W$, and $D_H$ values will vary according to the particular application of the head/slider assembly.

Figure 13A:
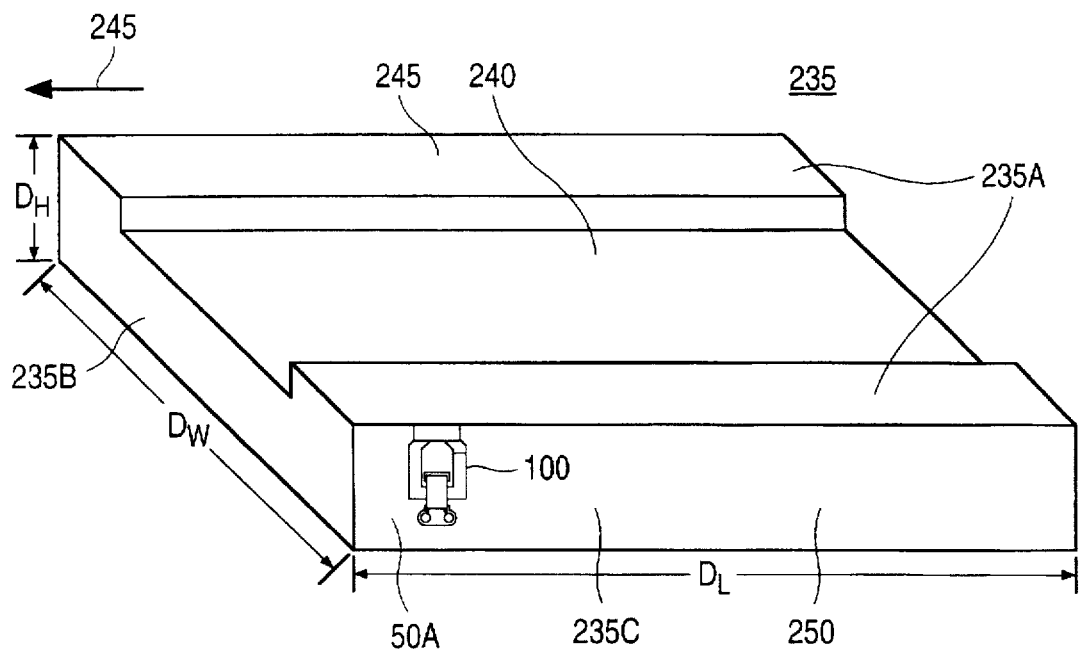
FIG. 13A is a perspective view of one head/slider assembly fabricated in accordance with the present invention.
Figure 13B:
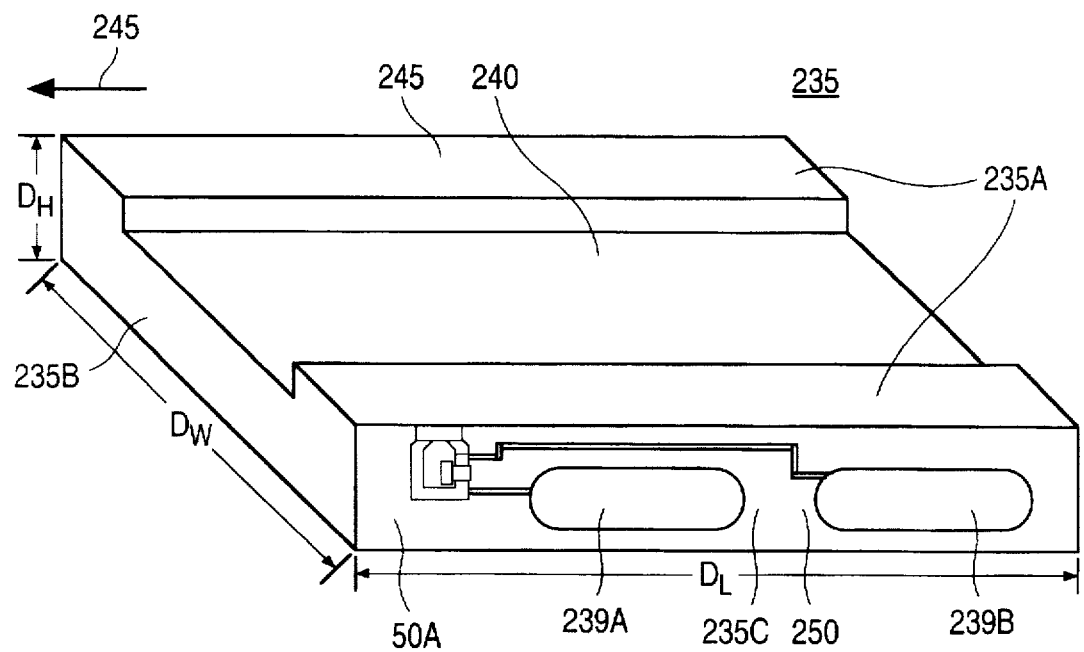
FIG. 13B is a perspective view of another head/slider assembly fabricated in accordance with the present invention.

As seen in FIG. 13A, a channel 240 is machined in the media surface 235A of head/slider assembly 235 which the gap of head 100 faces. In other words, channel 240 is machined in the "media side" of head/slider assembly 235, namely the side of assembly 235 which faces the magnetic recording media. When channel 240 is so machined, substantially parallel rails 245 and 250 are formed. The recording media (not shown) is positioned parallel with and in close proximity to the media surface 235A of slider 235. The recording media may be a magnetic disk, tape or other moving magnetic media. Angled flying surfaces, such as those shown on the rails in FIG. 1B, may be incorporated in rails 245 and 250.

Figure 1A:
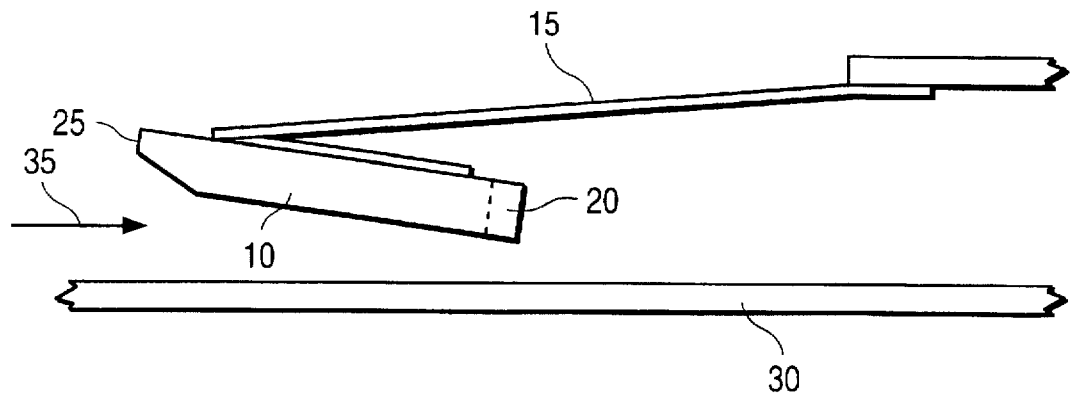
FIG. 1A is a conventional thin film head/slider assembly with a mechanical stepping actuator.
Figure 1B:
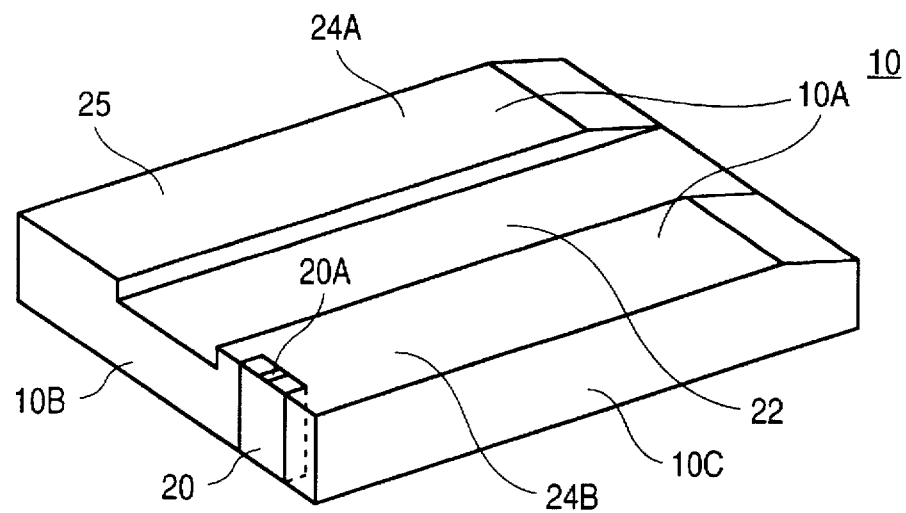
FIG. 1B is perspective view of the conventional thin film head/slider assembly of FIG. 1A.

A third axis head 100 is thus formed on substrate portion 50A. Third axis head 100 is to be contrasted with first axis heads and second axis heads. For comparison purposes, a first axis head is defined to be a head situated on "planar" surface 235A (the first axis surface). Surface 235A is said to be planar in that it is parallel with the plane of the recording media (not shown). Although substantially planar, surface 235A does include the already described channel 240. A first axis head is planar and substantially parallel with respect to the media. The orientation of a slider with respect to the recording media is illustrated in FIG. 1A. In actual practice, the slider is oriented more parallel with the recording media 30 than indicated in FIG. 1A.

A head located on surface 235B (the second axis surface) and oriented perpendicular to the media is an example of a second axis head. A second axis head is perpendicular to the direction of media travel. For example, a head situated on surface 235B is a second axis head. A simplified example of a second axis head was illustrated in FIG. 1B.

The disclosed head 100 of FIGS. 13A and 13B is a third axis head which is situated on slider surface 235C (the third axis surface). Third axis head 100 is oriented substantially perpendicular to the media (not shown) and substantially parallel to the direction of media travel. The direction of travel of the media is indicated by arrow 245 above head/slider assembly 235. Although not shown in FIGS. 13A and 13B, the recording media would be position slightly above head 100 in FIGS. 13A and 13B.

Figure 14:
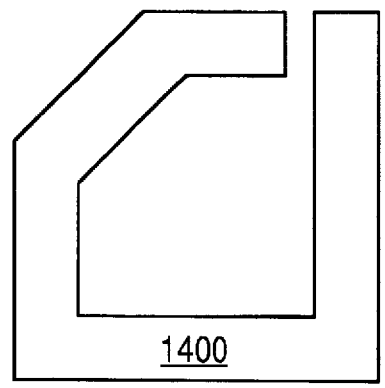
FIG. 14 shows a preferred implementation of the magnetic core employing an asymmetric gap region.
Figure 15:
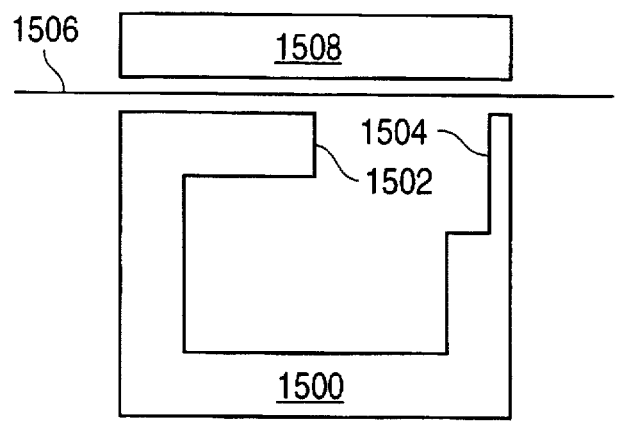
FIG. 15 shows a magnetic core for an orthogonal field head.

The thin film head process described herein forms a thin film head in which the magnetic field is longitudinal. However, the process may be varied to achieve different core types and gap orientations. FIG. 14 shows a preferred implementation of a core 1400. FIG. 15 shows a core 1500 for an orthogonal field head. The core 1500 has an elongated section 1502 and a restricted section 1504. In practice, a magnetically permeable body 1508 is placed opposite sections 1502 and 1504, with the gap region being the air space therebetween and the magnetic media 1506 occupying the gap region. The dense flux region between the restricted section 1504 and the body 1508 writes and reads the media 1506.

In the particular "third axis" head assembly shown in FIG. 11C, the coil structure is wound around lower core member 180C. Other embodiments are also possible wherein the coil structure is wound around side core member 180A or side core member 180B. Moreover, if desired in a particular application, the coil structure can be divided over two or more of core members 180A, 180B and 180C. Although the particular head described above is situated on the third axis surface, the head can also be situated on the second axis surface if desired.

While a "third axis" slider/head assembly apparatus has been described above, it is clear that a method for fabricating such an integral slider/head assembly is also disclosed. Briefly, a method of fabricating an integral slider/head assembly is provided which includes the step of providing a slider substrate including a first axis surface, a second axis surface and a third axis surface, the slider substrate including a common edge at which the first surface abuts the third surface. The method also includes the step of forming a magnetic core on the slider, the magnetic core including a gap region which opens onto the common edge of the slider. The method still further includes the step of forming a hard protective layer atop the magnetic core and covering the magnetic core adjacent the common edge of the slider.

In the disclosed third axis head 100, the head gap is on the side edge the slider so as to permit the head to get closer to the edge of the ever smaller magnetic recording media. This is a significant advantage over second axis heads. Moreover, the disclosed third axis thin film head does not suffer from the disadvantage of second film heads wherein the size of the coil structures and contact structures limit the machining and location of slots and channels which control the slider's flying performance over the recording media.

While only certain preferred features of the invention have been shown by way of illustration, many modifications and changes will occur. It is, therefore, to be understood that the present claims are intended to cover all such modifications and changes which fall within the true spirit of the invention.

I claim:

1. A slider/head assembly comprising:
   a slider substrate having a generally hexahedral structure with five substantially flat surfaces including a base surface, a leading end surface, a trailing end surface, a first side surface and a second side surface, and a top surface including a rectangular groove extending from the leading end surface to the trailing end surface, the first side surface abutting the top surface at a common edge;
   a magnetic core coupled to the first side surface of the slider substrate, the magnetic core forming a solid, substantially annular structure with substantially the same cross-section and thickness throughout the structure, the substantially annular structure being plated from a magnetically plateable material, the substantially annular structure being opened by a gap region extending from an inner edge of the substantially annular structure to an outer edge of the substantially annular structure, the gap region opening onto the common edge of the slider substrate;
   a hard protective layer covering the gap region and covering a portion of the magnetic core substantially from the inner edge of the substantially annular structure to the outer edge of the substantially annular structure at the common edge of the slider substrate, the hard protective layer extending to a substantially planar edge that is substantially coplanar with the top surface of the slider substrate; and
   a substantially helically-shaped coil, the coil is plated encircling a portion of the magnetic core removed from the portion of the magnetic core covered by the hard protective layer.

2. The slider/head assembly of claim 1 wherein the hard protective layer exhibits a hardness substantially greater than the hardness of the magnetic core.

3. The slider/head assembly of claim 2 wherein the hard protective layer comprises a diamond-like carbon (DLC) layer.

4. The slider/head assembly of claim 1 wherein the substrate is fabricated from a substrate material exhibiting a hardness substantially greater than the hardness of the magnetic core.

5. The slider/head assembly of claim 4 wherein the substrate material is alumina.

6. The slider/head assembly of claim 1 wherein the coil comprises a lower coil layer plated between the slider substrate and the magnetic core, the lower coil layer including a first end.

7. The slider/head assembly of claim 6 wherein the coil further comprises an upper coil layer plated overlying the magnetic core.

8. The slider/head assembly of claim 6 wherein the coil further comprises an upper coil layer plated overlying the magnetic core, the upper coil layer being coupled to the lower coil layer to form the coil, the upper coil layer including a second end.

9. The slider/head assembly of claim 7 further comprising first and second electrical contacts positioned on the first side surface of the slider substrate, the first and second electrical contacts being plated to couple to the first and second ends, respectively, of the coil.

10. The slider/head assembly of claim 1 wherein the gap region is fabricated from a gap material exhibiting a hardness substantially greater than the hardness of the magnetic core.

11. The slider/head assembly of claim 10 wherein the gap material is diamond-like carbon (DLC).

12. The slider/head assembly of claim 1 further comprising first and second electrical contacts positioned on the first side surface of the slider substrate, the first and second electrical contacts being plated to couple to the coil.

13. A method of fabricating an integral slider/head assembly comprising the steps of:
   forming a slider substrate having a generally hexahedral structure with five substantially flat surfaces including a base surface, a leading end surface, a trailing end surface, a first side surface and a second side surface, and a top surface including a rectangular groove extending from the leading end surface to the trailing end surface, the first side surface abutting the top surface at a common edge;
   plating a magnetic core onto the first side surface of the slider substrate, the magnetic core being plated from a magnetically plateable material into a solid, substantially annular structure with substantially the same cross-section and thickness throughout the structure, the substantially annular structure opened by a gap region extending from an inner edge of the substantially annular structure to an outer edge of the substantially annular structure and opens onto the common edge of the slider substrate; and forming a hard protective layer covering the gap region and covering a portion of the magnetic core substantially from the inner edge of the substantially annular structure to the common edge of the slider substrate, the hard protective layer extending to a substantially planar edge that is substantially coplanar with the top surface of the slider substrate; and plating a substantially helically-shaped coil, the coil is plated encircling a portion of the magnetic core removed from the portion of the magnetic core covered by the hard protective layer.

14. The method of claim 13 wherein the step of plating the magnetic core further comprises:

plating a first magnetic core portion including a first gap end adjacent the common edge.

15. The method of claim 14 further comprising the step of forming the gap region at the first gap end by depositing a gap material in the gap region, the gap material exhibiting a hardness greater than the hardness of the magnetic core, the gap region being formed to have an edge substantially coplanar with the top surface of the slider substrate.

16. The method of claim 15 further comprising the step of plating a second magnetic core portion including a second gap end adjacent the first gap end, the second gap end being separated from the first gap end by the gap region therebetween, the first magnetic core portion being joined to the second magnetic core portion to form the magnetic core.

17. The method of claim 13 wherein the step of forming a hard protective layer comprises depositing a layer of diamond-like carbon (DLC) overlying the magnetic core and covering the magnetic core adjacent the common edge of the slider, forming an edge of the hard protective layer substantially coplanar with the top surface of the slider substrate.

18. The method of claim 17 wherein the diamond-like carbon is deposited by chemical vapor deposition.

19. A method of fabricating an integral slider/head assembly comprising the steps of:

forming a substrate including first and second opposed planar surfaces;

plating an array including a plurality of spaced-apart magnetic cores on the first planar surface of the substrate, each magnetic core having a substantially annular structure with substantially the same cross-section and thickness throughout the structure, the substantially annular structure opened by a gap region which extends from an inner edge of the substantially annular structure to an outer edge of the substantially annular structure forming a hard protective layer covering the gap region and covering a portion of each magnetic core substantially from the inner edge to the outer edge of the substantially annular structure;

plating a plurality of substantially helically-shaped coils for each magnetic core, the coils are plated encircling a portion of the magnetic core removed from the portion of the magnetic core covered by the hard protective layer; and dicing the substrate into a plurality of slider/head assemblies each including a magnetic core with a protective layer thereon, each slider/head assembly thus formed having a generally hexahedral structure with five substantially flat surfaces including a base surface, a leading end surface, a trailing end surface, a first side surface and a second side surface, and a top surface including a rectangular groove extending from the leading end surface to the trailing end surface, the first side surface abutting the top surface at a common edge, the gap region of each slider/head assembly being positioned at the common edge and the hard protective layer having an edge substantially coplanar with the top surface of the slider substrate.

20. The method of claim 19 wherein each magnetic core is formed by fabricating a first magnetic core portion including a first gap end.

21. The method of claim 20 further comprising the step of forming the gap region at the first gap end of each first magnetic core portion by depositing a gap material in the gap region, the gap material exhibiting a hardness greater than the hardness of the magnetic core, the gap region being formed to have an edge substantially coplanar with the top surface of the slider substrate.

22. The method of claim 21 further comprising the step of forming a second magnetic core portion including a second gap end adjacent the first gap end of each first magnetic core portion, the second gap end being separated from the first gap end by the gap region therebetween, the first magnetic core portion being joined to the second magnetic core portion to form the magnetic core of each slider/head assembly of the array.

23. The method of claim 19 wherein the step of forming a hard protective layer comprises depositing a layer of diamond-like carbon (DLC) atop the magnetic core of each slider/head assembly, forming an edge of the hard protective layer substantially coplanar with the top surface of the slider substrate.

24. The method of claim 23 wherein the diamond-like carbon is deposited by chemical vapor deposition.

25. A method for fabricating a thin film head having a magnetic gap formed in a magnetically permeable core, comprising:

forming a substrate of a material substantially harder than the core;

plating a first coil portion over the substrate;

depositing an insulator layer over the first coil portion;

plating a first member of the core over the substrate with a first region of the first core member overlying the insulator layer over the first coil portion and with a second region, removed from the first region, of the first core member having a gap-defining surface, the first core member having a substantially annular structure with substantially the same cross-section and thickness throughout the structure;

depositing an insulator layer over the first region of the first member of the core;

plating a second coil portion overlying the insulator over the first region of the first core member, the second coil being electrically integrated with the first coil portion to provide an induction coil;

forming gap-defining material adjacent to the gap-defining surface of the first core member, the gap-defining material being formed to have an edge substantially coplanar with a top face of the substrate;

plating a second member of the core over the substrate, the second core member having a gap-defining surface opposite the gap-defining surface of the first core member, and a magnetic coupling surface magnetically coupled to a magnetic coupling surface of the first core member, the gap-defining material being between the gap-defining surfaces of the first and second core members; and forming, subsequent to the forming gap-defining material step and the plating a second member of the core step, a protective member over the second region of the first core member in proximity to the gap-defining surface and not extending over the coil portions, the protective member being supported by the substrate and being of a material substantially harder than the core, the protective member and the substrate each having a mutually coplanar edge intersected by the gap-defining surface, the protective member isolating the second region of the first core member.

26. A method as in claim 25 wherein the gap-defining material is substantially harder than the core.

27. A method as in claim 26 wherein:

the substrate providing step comprises providing an alumina substrate;

the first core member forming step comprises plating nickel-iron;

the second core member forming step comprises plating nickel-iron;

the protective member forming step comprises depositing a diamond-like carbon-layer; and the forming gap-defining material step comprises depositing a diamond-like carbon layer.

28. A method as in claim 25 wherein the first and second core members are respective first and second thin film features, the gap-defining surfaces being respective edges of the first and second thin film features.

29. A method as in claim 25 wherein the first and second core members are respective first and second thin film features, the gap-defining surfaces being respective portions of major surfaces of the first and second thin film features.

30. A method as in claim 25 further comprising:

cutting the substrate to form a rough head unit edge proximate to the gap-defining material; and lapping the rough head unit edge to form a finished head unit edge that includes the gap-defining material disposed between the gap-defining surfaces of the first and second core members.

31. A method as in claim 25 wherein the first core member is a thin film feature, the gap-defining surface comprising an elongated surface region and a restricted-length surface region.

32. A method as in claim 25 further comprising:

cutting the substrate to form a rough head unit edge proximate to the gap-defining edge of the first core member; and lapping the rough head unit edge to form a finished head unit edge that includes the gap-defining surface of the first core member.

\* \* \* \* \*